(12) United States Patent
Shim

(10) Patent No.: US 10,275,384 B2
(45) Date of Patent: *Apr. 30, 2019

(54) TRANSMITTING DEVICE FOR HIGH SPEED COMMUNICATION, AND INTERFACE CIRCUIT AND SYSTEM INCLUDING THE SAME

(71) Applicant: SK hynix Inc., Icheon-si, Gyeonggi-do (KR)

(72) Inventor: Jong Joo Shim, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 504 days.

This patent is subject to a terminal disclaimer.

(21) Appl. No.: 15/044,307

(22) Filed: Feb. 16, 2016

(65) Prior Publication Data

US 2017/0060803 A1  Mar. 2, 2017

(30) Foreign Application Priority Data

Aug. 31, 2015 (KR) .......................... 10-2015-0122937

(51) Int. Cl.
| | | |
|---|---|---|
| H04L 25/02 | (2006.01) | |
| G06F 13/40 | (2006.01) | |
| G06F 13/42 | (2006.01) | |
| H04L 25/49 | (2006.01) | |

(52) U.S. Cl.
CPC ...... *G06F 13/4072* (2013.01); *G06F 13/4282* (2013.01); *H04L 25/026* (2013.01); *H04L 25/4917* (2013.01); *Y02D 10/14* (2018.01); *Y02D 10/151* (2018.01)

(58) Field of Classification Search
CPC ....... H03M 5/16; H03M 5/20; H04L 25/0272; H04L 25/4917; H04L 25/493; H04L 25/026; Y02B 60/1228; G06F 13/4072; G06F 13/4282; Y02D 10/14; Y02D 10/151

See application file for complete search history.

(56) References Cited

U.S. PATENT DOCUMENTS

| | | | |
|---|---|---|---|
| 5,332,932 A * | 7/1994 | Runaldue ......... | H03K 19/00361 326/33 |
| 7,915,914 B1 * | 3/2011 | Ker .................. | H03K 19/00384 326/30 |
| 9,112,550 B1 * | 8/2015 | Ulrich ...................... | H04B 3/04 |
| 2014/0153665 A1 | 6/2014 | Wiley et al. | |
| 2014/0198837 A1 | 7/2014 | Fox et al. | |

FOREIGN PATENT DOCUMENTS

| | | |
|---|---|---|
| KR | 100555571 B1 | 2/2006 |
| KR | 100940834 B1 | 1/2010 |

* cited by examiner

*Primary Examiner* — Vineeta S Panwalkar
(74) *Attorney, Agent, or Firm* — William Park & Associates Ltd.

(57) ABSTRACT

A transmitting device may include a logic circuit, a transmission controller, and a transmission driver. The encoder may generate transmission control signals based on control symbols. The transmission controller may generate driving control signals based on the transmission control signals. The transmission driver may drive a wire to one level among multiple levels, based on the driving control signals.

22 Claims, 16 Drawing Sheets

TRANSMITTING DEVICE FOR HIGH SPEED COMMUNICATION, AND INTERFACE CIRCUIT AND SYSTEM INCLUDING THE SAME

CROSS-REFERENCES TO RELATED APPLICATION

The present application claims priority under 35 U.S.C. § 119(a) to Korean application number 10-2015-0122937, filed on Aug. 31, 2015, in the Korean Intellectual Property Office, which is incorporated herein by reference in its entirety.

BACKGROUND

1. Technical Field

Various embodiments generally relate to a semiconductor system, and more particularly, to a transmitting device for high speed communication, and an interface circuit and a system including the same.

2. Related Art

Electronic products for personal uses, such as a personal computer, a tablet PC, a laptop computer and a smart phone, may be configured by various electronic components. Two different electronic components within the electronic products may communicate with each other at a high speed to process a large amount of data within a short time. The electronic components may generally communicate through interface circuits. Various schemes may be used by the electronic components to communicate. For example, a serial communication scheme may be used by the electronic components to communicate.

As the performances of electronic components are improved, necessity for a communication scheme capable of increasing a bandwidth and reducing power consumption is desired. In order to meet such necessity, various new serial communication schemes are suggested in the art, and improved interface circuits for supporting the new serial communication schemes are being developed.

DETAILED DESCRIPTION

Various embodiments may be directed to a transmitting device capable of changing wire states according to data and/or symbols to transmit, in a system communicating by transmitting balanced code multilevel symbols.

In an embodiment, a transmitting device may be provided. The transmitting device may include a logic circuit configured to generate control symbols. The transmitting device may include an encoder configured to change information of a wire state based on the control symbols, and generate transmission control signals. The transmitting device may include a transmission controller configured to generate driving control signals based on the transmission control signals. The transmitting device may include a transmission driver configured to drive each of a plurality of wires to one level among multiple levels, in response to the driving control signals.

In an embodiment, a transmitting device configured for changing states of first to third wires to one of a high level, a middle level and a low level, based on a control symbol, may be provided. The transmitting device may include a first transmission driver including a plurality of pull-up drivers and a plurality of pull-down drivers, and configured to drive the first wire to one of the high level, the middle level and the low level. The transmitting device may include a second transmission driver including a plurality of pull-up drivers and a plurality of pull-down drivers, and configured to drive the second wire to one of the high level, the middle level and the low level. The transmitting device may include a third transmission driver including a plurality of pull-up drivers and a plurality of pull-down drivers, and configured to drive the third wire to one of the high level, the middle level and the low level.

In an embodiment, a transmitting device may be provided. The transmitting device may include at least 3 pull-up drivers and at least 3 pull-down drivers and configured for driving a wire coupled thereto to one level of a high level, a middle high level, a middle low level and a low level. The transmitting device may drive the wire to the high level by turning on 3 pull-up drivers, drive the wire to the middle high level by turning on 2 pull-up drivers and 1 pull-down driver, drive the wire to the middle low level by turning on 1 pull-up driver and 2 pull-down drivers, and drive the wire to the low level by turning on 3 pull-down drivers.

Hereinafter, a transmitting device for high speed communication, and an interface circuit and a system including the same will be described below with reference to the accompanying drawings through various examples of embodiments.

Figure 1:
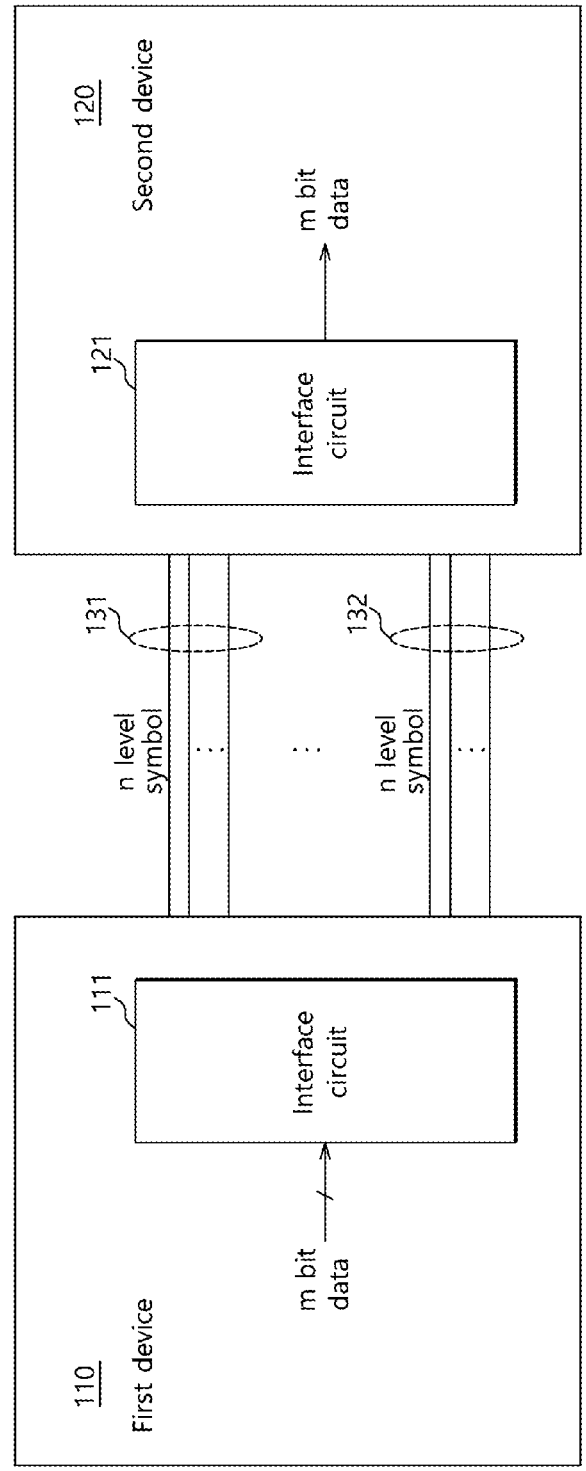
FIG. 1 is a diagram illustrating a representation of an example of the configuration of a system in accordance with an embodiment.

Referring to FIG. 1, a system 1 in accordance with an embodiment may include a first device 110 and a second device 120. The first device 110 may represent a component which transmits data, and the second device 120 may represent a component which receives data transmitted from the first device 110. For example, the system 1 may include a master device and a slave device. When data are transmitted from the master device to the slave device, the master device may be the first device 110, and the slave device may be the second device 120. Conversely, when data are transmitted from the slave device to the master device, the master device may be the second device 120, and the slave device may be the first device 110.

The master device may be a host device such as a processor, and the processor may include a central processing unit (CPU), a graphic processing unit (GPU), a multimedia processor (MMP) or a digital signal processor (DSP). The master device may be realized in the form of a system-on-chip (SoC) by combining processor chips having various functions, such as application processors. The slave device may be a memory, and the memory may include a volatile memory or a nonvolatile memory. The volatile memory may include, for example but not limited to, an SRAM (static RAM), a DRAM (dynamic RAM) or an SDRAM (synchronous DRAM), and the nonvolatile memory may include a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) or an FRAM (ferroelectric RAM).

The first device 110 and the second device 120 may form a link by being electrically coupled with each other through at least one signal transmission line group. The first device 110 and the second device 120 may communicate in a balanced code multilevel signal transmission scheme through the at least one signal transmission line group. The at least one signal transmission line group may include a plurality of signal transmission lines. For example, in the case where the first device 110 and the second device 120 use an n-level (phase or state) signal transmission scheme, the number of signal transmission lines which form one signal transmission line group may be equal to or larger than n. The first device 110 and the second device 120 may be electrically coupled through a plurality of signal transmission line groups. Referring to FIG. 1, the first device 110 and the second device 120 may be electrically coupled through first and second signal transmission line groups 131 and 132, and each of the first and second signal transmission line groups 131 and 132 may include at least n number of signal transmission lines.

The first device 110 and the second device 120 may respectively include interface circuits 111 and 121. The interface circuits 111 and 121 may be physical layers for communication between the first device 110 and the second device 120. The interface circuit 111 of the first device 110 may convert a plurality of data into n-level symbols, and transmit the n-level symbols to the second device 120 through the signal transmission line groups 131 and 132. The n-level symbols may be configured by balanced codes. The interface circuit 121 of the second device 120 may receive the n-level symbols transmitted through the signal transmission line groups 131 and 132, and recover the n-level symbols into the plurality of data. For instance, in the case where the plurality of data are m bits, the interface circuit 111 of the first device 110 may convert the m-bit data into a plurality of n-level symbols, and sequentially transmit in series the plurality of n-level symbols through the signal transmission lines. The interface circuit 121 of the second device 120 may sequentially receive the plurality of n-level symbols, and recover the m-bit data based on the plurality of n-level symbols. In the case where the first device 110 and the second device 120 include a plurality of signal transmission line groups, information corresponding to the number of signal transmission line groups*n levels of symbols may be simultaneously transmitted.

In an embodiment, one n-level symbol may not be configured by balanced codes, and a plurality of n-level symbols may be configured by balanced codes. That is to say, the plurality of n-level symbols may become balanced codes in their entireties. Accordingly, even though each symbol is not configured by balanced codes, in the case where the plurality of n-level symbols are transmitted through the signal transmission line groups 131 and 132, balanced code multilevel signal transmission may be implemented.

Figure 2:
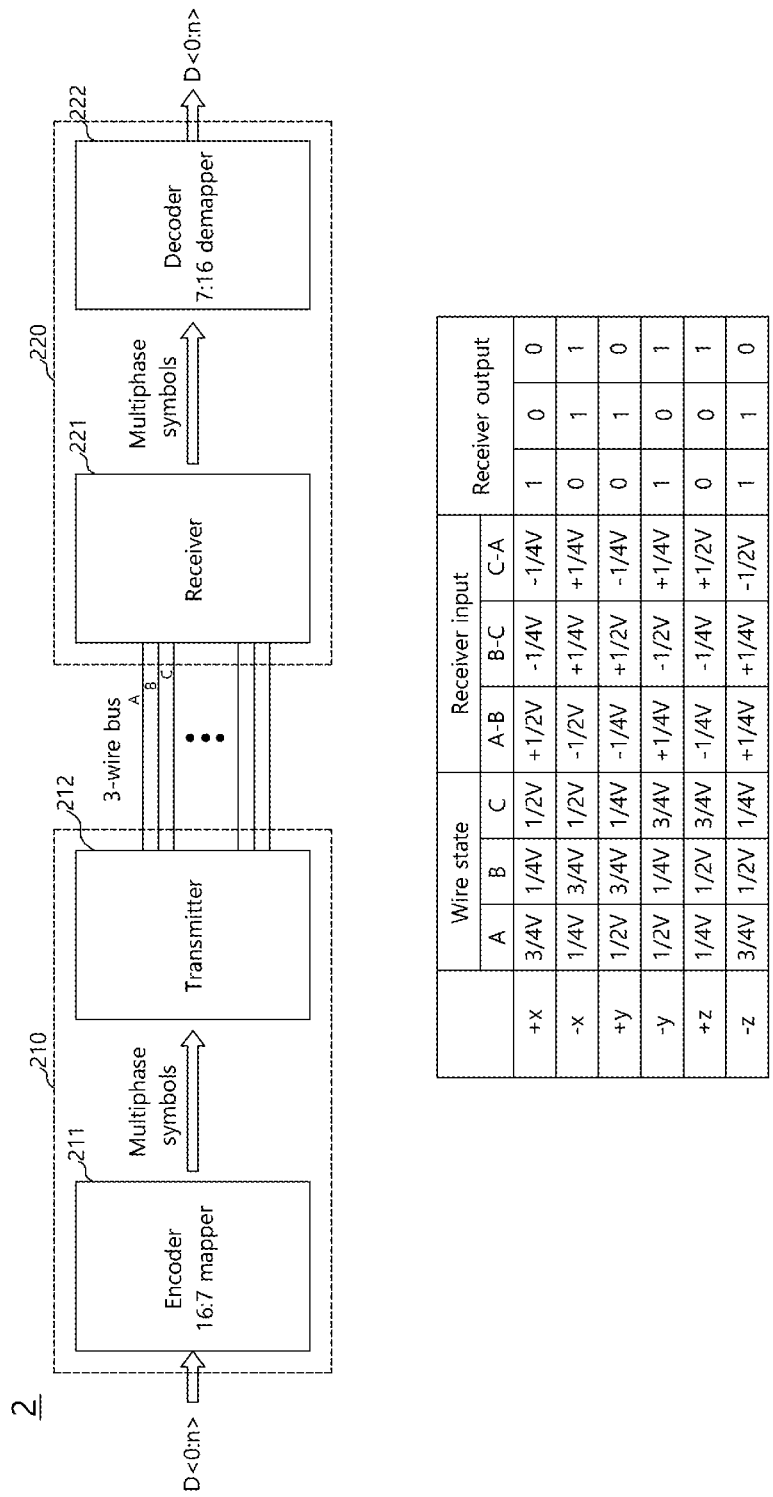
FIG. 2 is a diagram illustrating a representation of an example of the configuration and the operation of a system in accordance with an embodiment.

FIG. 2 is a diagram illustrating a representation of an example of the configuration and the operation of a system 2 in accordance with an embodiment. Referring to FIG. 2, the system 2 in accordance with an embodiment may include a master device 210 and a slave device 220. The master device 210 and the slave device 220 may configure one link. The master device 210 and the slave device 220 may communicate through sub links. For example, the master device 210 and the slave device 220 may include interface circuits, respectively, to communicate at a high speed. The master device 210 and the slave device 220 may be coupled through signal transmission lines, and may exchange signals through the signal transmission lines and the interface circuits.

The system 2 in accordance with an embodiment may communicate in a balanced code multilevel signal transmission scheme. The master device 210 and the slave device 220 may be coupled through a wire bus. The wire bus may include a plurality of wire groups, and each wire group may include a plurality of wires. For example, the wire bus may be a 3-wire bus, and each wire group may include 3 wires. The 3 wires of each wire group may be driven to voltage levels corresponding to a symbol to be transmitted from the master device 210 to the slave device 220 or from the slave device 220 to the master device 210. The 3 wires of each wire group may be driven to a high level, a middle level and a low level to transmit the symbol. For example, the high level may be a voltage level corresponding to $\frac{3}{4}$ V, the middle level may be a voltage level corresponding to $\frac{1}{2}$ V, and the low level may be a voltage level corresponding to $\frac{1}{4}$ V.

Referring to FIG. 2, the master device 210 may include an encoder 211 and a transmitter 212. The encoder 211 and the transmitter 212 may be an interface circuit for balanced code multilevel signal transmission. The encoder 211 may encode data D<0:n> into a plurality of multilevel symbols. The encoder 211 may be, for example but not limited to, a 16:7 mapper which converts 16-bit data into 7 multilevel symbols. The transmitter 212 may receive the plurality of multilevel symbols outputted from the encoder 211. The transmitter 212 may change the voltage levels or states of the 3-wire bus according to the multilevel symbols. The multilevel symbols may be, for example, 3-level symbols, and each symbol may include 3 phases. The 3-level symbols may include first to sixth symbols. The first to sixth symbols may mean 6 wire states, respectively. The first to sixth symbols may be defined as +x, −x, +y, −y, +z and −z. The first symbol +x may have the phases of 1, 0, 0, the second symbol −x may have the phases of 0, 1, 1, the third symbol +y may have the phases of 0, 1, 0, the fourth symbol −y may have the phases of 1, 0, 1, the fifth symbol +z may have the phases of 0, 0, 1, and the sixth symbol −z may have the phases of 1, 1, 0. Since the transmitter 212 should change the voltage levels or states of the 3-wire bus according to the multilevel symbols, the transmitter 112 may not use a symbol which has the phases of 0, 0, 0 or 1, 1, 1.

In order to transmit the first symbol +x, the transmitter 212 may change the states of 3 wires A, B and C to the high level of ¾ V, the low level of ¼ V and the middle level of ½ V, respectively. In order to transmit the second symbol −x, the transmitter 212 may change the states of 3 wires A, B and C to the low level of ¼ V, the high level of ¾ V and the middle level of ½ V, respectively. In order to transmit the third symbol +y, the transmitter 212 may change the states of 3 wires A, B and C to the middle level of ½ V, the high level of ¾ V and the low level of ¼ V, respectively. In order to transmit the fourth symbol −y, the transmitter 212 may change the states of 3 wires A, B and C to the middle level of ½ V, the low level of ¼ V and the high level of ¾ V, respectively. In order to transmit the fifth symbol +z, the transmitter 212 may change the states of 3 wires A, B and C to the low level of ¼ V, the middle level of ½ V and the high level of ¾ V, respectively. In order to transmit the sixth symbol −z, the transmitter 212 may change the states of 3 wires A, B and C to the high level of ¾ V, the middle level of ½ V and the low level of ¼ V, respectively.

The slave device 220 may include a receiver 221 and a decoder 222. The receiver 221 and the decoder 222 may be an interface circuit for balanced code multilevel signal reception. The receiver 221 may be coupled with the 3-wire bus, and may receive the plurality of multilevel symbols according to the voltage levels of the 3-wire bus. While not illustrated, the receiver 221 may include 3 differential buffers in correspondence to 3 wires. The 3 differential buffers may be coupled with at least 2 of the 3 wires A, B and C. For example, a first differential buffer may output the first phase of a multilevel symbol by differentially amplifying the voltage level difference A-B of the first wire and the second wire, a second differential buffer may output the second phase of the multilevel symbol by differentially amplifying the voltage level difference B-C of the second wire and the third wire, and a third differential buffer may generate the third phase of the multilevel symbol by differentially amplifying the voltage level difference C-A of the third wire and the first wire. Therefore, the receiver 221 may output the same multilevel symbols as the multilevel symbols transmitted through the transmitter 212, according to the states or voltage levels of the 3-wire bus.

For example, in the case where the first symbol +x is transmitted, the voltage level of the first wire A may be ¾ V, the voltage level of the second wire B may be ¼ V, and the voltage level of the third wire C may be ½ V. The receiver 221 may output the first phase of the multilevel symbol as 1 by differentially amplifying the voltage level difference A-B of +½ V of the first and second wires, may output the second phase of the multilevel symbol as 0 by differentially amplifying the voltage level difference B-C of −¼ V of the second and third wires, and may output the third phase of the multilevel symbol as 0 by differentially amplifying the voltage level difference C-A of −¼ V of the third and first wires.

The decoder 222 may decode multilevel symbols into data. The decoder 222 may be a 7:16 demapper which decodes 7 multilevel symbols into 16-bit data. The encoding scheme of the encoder 211 and the decoding scheme of the decoder 222 may be complementary to each other. While FIG. 2 shows an example in which data are transmitted from the master device 210 to the slave device 220, it is to be noted that the embodiment is not limited to such an example. The slave device 220 may further include components such as the encoder 211 and the transmitter 212 to transmit data to the master device 210, and the master device 210 may further include components such as the receiver 221 and the decoder 222 to receive data from the slave device 220.

Figure 3:
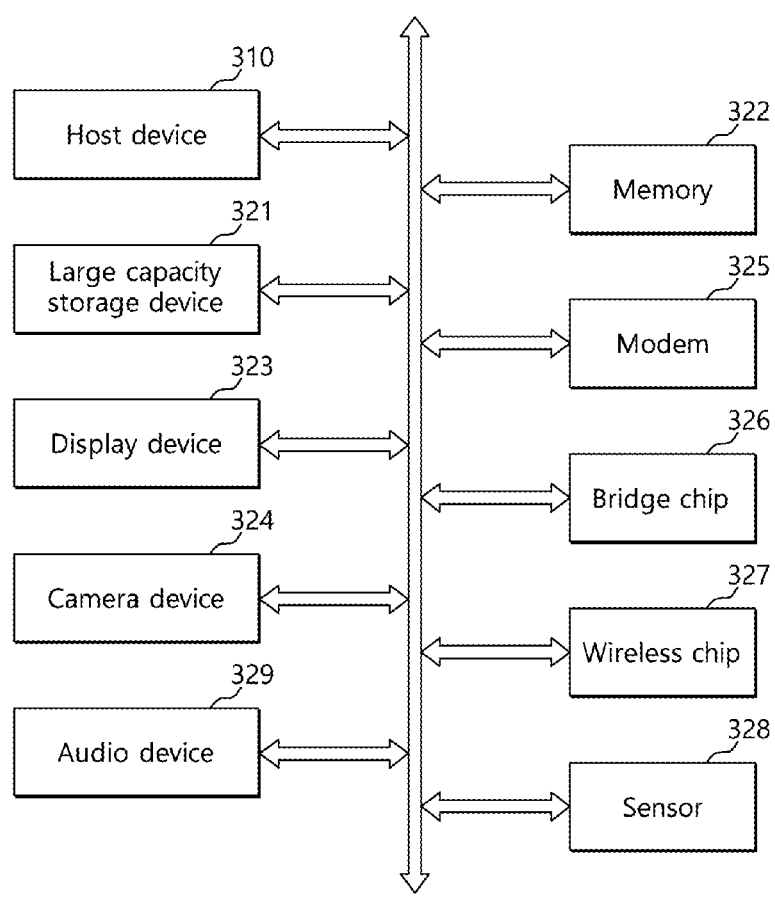
FIG. 3 is a diagram illustrating a representation of an example of a system including electronic components which use the balanced code multilevel signal transmission scheme described with reference to FIGS. 1 and 2.

FIG. 3 is a diagram illustrating a representation of an example of a system 3 including electronic components which use the balanced code multilevel signal transmission scheme described with reference to FIGS. 1 and 2. Referring to FIG. 3, the system 3 may include, for example, a host device 310, a large capacity storage device 321, a memory 322, a display device 323, a camera device 324, a modem 325, a bridge chip 326, a wireless chip 327, a sensor 328, and an audio device 329. The host device 310 may communicate with the remaining components by forming respective individual links. The components for an electronic device illustrated in FIG. 3 are nothing but a mere illustration, and it is to be noted that the system 3 may include any components capable of performing data communication with the host device 310.

The host device 310 may include at least one integrated circuit device such as an application processor and an application specific integrated circuit (ASIC). The large capacity storage device 321 may include at least one storage device such as a solid state drive (SSD) and a flash drive through USB coupling. The memory 322 may include any kinds of memory devices. For example, the memory 322 may include a volatile memory device such as a DRAM (dynamic RAM), or may include a nonvolatile memory device such as a ROM (read only memory), a PROM (programmable ROM), an EEPROM (electrically erasable and programmable ROM), an EPROM (electrically programmable ROM), a FLASH memory, a PRAM (phase change RAM), an MRAM (magnetic RAM), an RRAM (resistive RAM) and an FRAM (ferroelectric RAM).

The host device 310 may communicate with the large capacity storage device 321 and the memory 322 by forming respective links. The host device 310, the large capacity storage device 321 and the memory 322 may include the interface circuits illustrated in FIGS. 1 and 2, and may exchange signals with one another in a serial communication scheme. Similarly, the host device 310 may communicate serially with the display device 323, the camera device 324, the modem 325, the bridge chip 326, the wireless chip 327, the sensor 328 and the audio device 329 by forming individual links.

Figure 4:
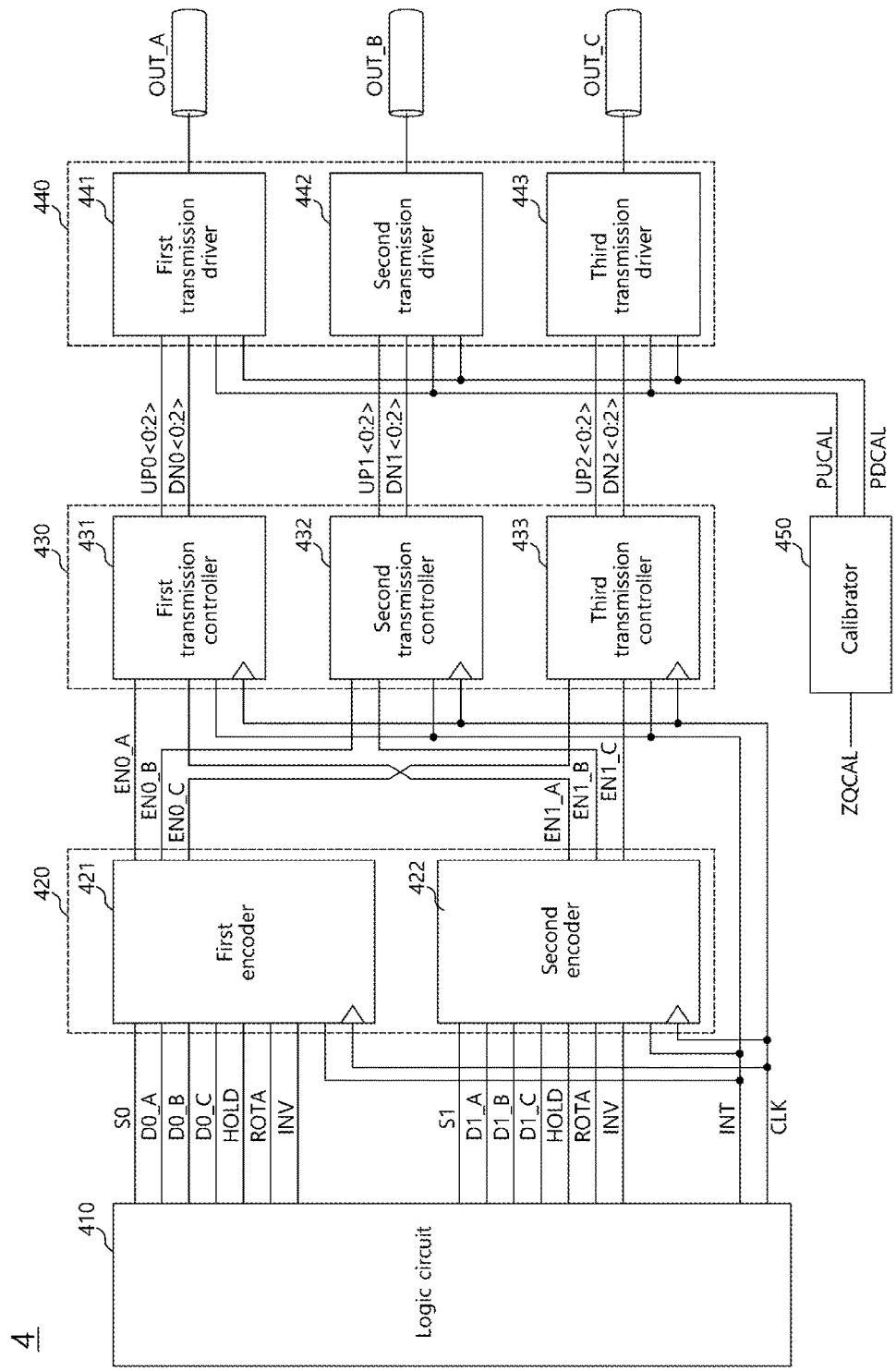
FIG. 4 is a diagram illustrating a representation of an example of the configuration of a transmitting device in accordance with an embodiment.

FIG. 4 is a diagram illustrating a representation of an example of the configuration of a transmitting device 4 in accordance with an embodiment. The transmitting device 4 may be applied as the interface circuits illustrated in FIGS.

1 and 2. Referring to FIG. 4, the transmitting device 4 may be coupled with a plurality of wires, and transmit data and/or a multilevel symbol through the plurality of wires. The multilevel symbol may be, for example, a 3-level symbol. When the multilevel symbol is a 3-level symbol, the plurality of wires may include 3 wires. In the following descriptions, it will be representatively explained that the transmitting device 4 outputs, for example but not limited to, a 3-level symbol through 3 wires.

The transmitting device 4 may include a logic circuit 410, an encoder 420, a transmission controller 430, and a transmission driver 440. The logic circuit 410 may generate control symbols HOLD, ROTA and INV and wire state information D0_A, D0_B, D0_C, D1_A, D1_B and D1_C. The logic circuit 410 may generate the control symbols HOLD, ROTA and INV based on data for the transmitting device 4 to transmit. The control symbols HOLD, ROTA and INV as signals for changing states of 3 wires OUT_A, OUT_B and OUT_C may include a hold information HOLD, a rotation information ROTA and an inversion information INV. The wire state information D0_A, D0_B, D0_C, D1_A, D1_B and D1_C may be information of initial wire states. The wire state information D0_A, D0_B, D0_C, D1_A, D1_B and D1_C may include MSB (most significant bit) information and LSB (least significant bit) information. The MSB information may include an MSB information D0_A of a first wire state, an MSB information D0_B of a second wire state, and an MSB information D0_C of a third wire state. The LSB information may include an LSB information D1_A of the first wire state, an LSB information D1_B of the second wire state, and an LSB information D1_C of the third wire state. The MSB and LSB information will be described later. The logic circuit 410 may additionally provide an initialization signal INT, initial setting signals S0 and S1, and a clock signal CLK.

The encoder 420 may change the wire state information D0_A, D0_B, D0_C, D1_A, D1_B and D1_C based on the control symbols HOLD, ROTA and INV, and generate transmission control signals EN0_A, EN0_B, EN0_C, EN1_A, EN1_B and EN1_C. The encoder 420 may change logic values of the wire state information D0_A, D0_B, D0_C, D1_A, D1_B and D1_C based on the control symbols HOLD, ROTA and INV. The transmission control signals EN0_A, EN0_B, EN0_C, EN1_A, EN1_B and EN1_C may be information of wire states to which changes should be made according to the control symbols HOLD, ROTA and INV. The encoder 420 may include first and second encoders 421 and 422.

The first encoder 421 may receive the MSB information D0_A, D0_B and D0_C and the control symbols HOLD, ROTA and INV. The first encoder 421 may change logic values of the MSB information D0_A, D0_B and D0_C according to the control symbols HOLD, ROTA and INV. The first encoder 421 may output the MSB information D0_A, D0_B and D0_C of which logic values are changed according to the control symbols HOLD, ROTA and INV, as first transmission control signals EN0_A, EN0_B and EN0_C. The first transmission control signals EN0_A, EN0_B and EN0_C may include first to third encoding signals EN0_A, EN0_B and EN0_C. The first encoding signal EN0_A may be MSB information of a first wire state that is changed according to the control symbols HOLD, ROTA and INV. The second encoding signal EN0_B may be MSB information of a second wire state that is changed according to the control symbols HOLD, ROTA and INV. The third encoding signal EN0_C may be MSB information of a third wire state that is changed according to the control symbols HOLD, ROTA and INV.

The second encoder 422 may receive the LSB information D1_A, D1_B and D1_C and the control symbols HOLD, ROTA and INV. The second encoder 422 may change logic values of the LSB information D1_A, D1_B and D1_C according to the control symbols HOLD, ROTA and INV. The second encoder 422 may output the LSB information D1_A, D1_B and D1_C of which logic values are changed according to the control symbols HOLD, ROTA and INV, as second transmission control signals EN1_A, EN1_B and EN1_C. The second transmission control signals EN1_A, EN1_B and EN1_C may include fourth to sixth encoding signals EN1_A, EN1_B and EN1_C. The fourth encoding signal EN1_A may be LSB information of the first wire state that is changed according to the control symbols HOLD, ROTA and INV. The fifth encoding signal EN1_B may be LSB information of the second wire state that is changed according to the control symbols HOLD, ROTA and INV. The sixth encoding signal EN1_C may be LSB information of the third wire state that is changed according to the control symbols HOLD, ROTA and INV.

The first to sixth encoding signals EN0_A, EN0_B, EN0_C, EN1_A, EN1_B and EN1_C may represent the wire states of the table illustrated in FIG. 2. The first and fourth encoding signals EN0_A and EN1_A may be respectively MSB and LSB information of a first wire state. The transmitting device 4 may drive a first wire OUT_A to a high level when the first and fourth encoding signals EN0_A and EN1_A are 1, 1. The transmitting device 4 may drive the first wire OUT_A to a middle level when the first and fourth encoding signals EN0_A and EN1_A are 1, 0 or 0, 1. The transmitting device 4 may drive the first wire OUT_A to a low level when the first and fourth encoding signals EN0_A and EN1_A are 0, 0. Similarly, the transmitting device 4 may drive a second wire OUT_B to a high level, a middle level and a low level according to the second and fifth encoding signals EN0_B and EN1_B, and drive a third wire OUT_C to a high level, a middle level and a low level according to the third and sixth encoding signals EN0_C and EN1_C. The wire state information D0_A, D0_B, D0_C, D1_A, D1_B and D1_C may represent initial wire states. For example, if the first wire OUT_A is initially a high level, the second wire OUT_B is initially a middle level and the third wire OUT_C is initially a low level, the wire state information D0_A and D1_A may be 1, 1, the wire state information D0_B and D1_B may be 1, 0 or 0, 1, and the wire state information D0_C and D1_C may be 0, 0.

The transmission controller 430 may generate driving control signals UP0<0:2>, DN0<0:2>, UP1<0:2>, DN1<0:2>, UP2<0:2> and DN2<0:2> based on the transmission control signals EN0_A, EN0_B, EN0_C, EN1_A, EN1_B and EN1_C. The transmission controller 430 may generate the driving control signals UP0<0:2>, DN0<0:2>, UP1<0:2>, DN1<0:2>, UP2<0:2> and DN2<0:2> based on the first and second transmission control signals EN0_A, EN0_B, EN0_C, EN1_A, EN1_B and EN1_C such that states of the first to third wires OUT_A, OUT_B and OUT_C may be changed. The transmission controller 430 may include first to third transmission controllers 431, 432 and 433. The first transmission controller 431 may generate first driving control signals UP0<0:2> and DN0<0:2> for driving the first wire OUT_A, based on the first encoding signal EN0_A and the fourth encoding signal EN1_A. The second transmission controller 432 may generate second driving control signals UP1<0:2> and DN1<0:2> for driving the second wire OUT_B, based on the second encoding signal EN0_B and the fifth encoding signal EN1_B. The third transmission controller 433 may generate third driving control signals UP2<0:2> and DN2<0:2> for driving the third wire OUT_C, based on the third encoding signal EN0_C and the sixth encoding signal EN1_C. Each of the first to third driving control signals UP0<0:2>, DN0<0:2>, UP1<0:2>, DN1<0:2>, UP2<0:2> and DN2<0:2> may include a plurality of up control signals and a plurality of down control signals.

The transmission driver 440 may change states of the first to third wires OUT_A, OUT_B and OUT_C based on the driving control signals UP0<0:2>, DN0<0:2>, UP1<0:2>, DN1<0:2>, UP2<0:2> and DN2<0:2>. The transmission driver 440 may drive each of the first to third wires OUT_A, OUT_B and OUT_C to one of a high level, a middle level and a low level, based on the driving control signals UP0<0:2>, DN0<0:2>, UP1<0:2>, DN1<0:2>, UP2<0:2> and DN2<0:2>. The transmission driver 440 may include first to third transmission drivers 441, 442 and 443. The first transmission driver 441 may drive the first wire OUT_A to one of a high level, a middle level and a low level, based on the first driving control signals UP0<0:2> and DN0<0:2>. The second transmission driver 442 may drive the second wire OUT_B to one of a high level, a middle level and a low level, based on the second driving control signals UP1<0:2> and DN1<0:2>. The third transmission driver 443 may drive the third wire OUT_C to one of a high level, a middle level and a low level, based on the third driving control signals UP2<0:2> and DN2<0:2>. Each of the first to third transmission drivers 441, 442 and 443 may include a plurality of pull-up drivers and a plurality of pull-down drivers which are coupled with each of the first to third wires OUT_A, OUT_B and OUT_C. The plurality of pull-up drivers and the plurality of pull-down drivers may be turned on according to the plurality of up control signals and the plurality of down control signals.

The transmitting device 4 may further include a calibrator 450. The calibrator 450 may set resistance values of the first to third transmission drivers 441, 442 and 443. The calibrator 450 may generate a pull-up calibration signal PUCAL and a pull-down calibration signal PDCAL based on a calibration signal ZQCAL. The pull-up calibration signal PUCAL may be a signal for controlling resistance values of the pull-up drivers of the first to third transmission drivers 441, 442 and 443, and the pull-down calibration signal PDCAL may be a signal for controlling resistance values of the pull-down drivers of the first to third transmission drivers 441, 442 and 443.

Figure 5:
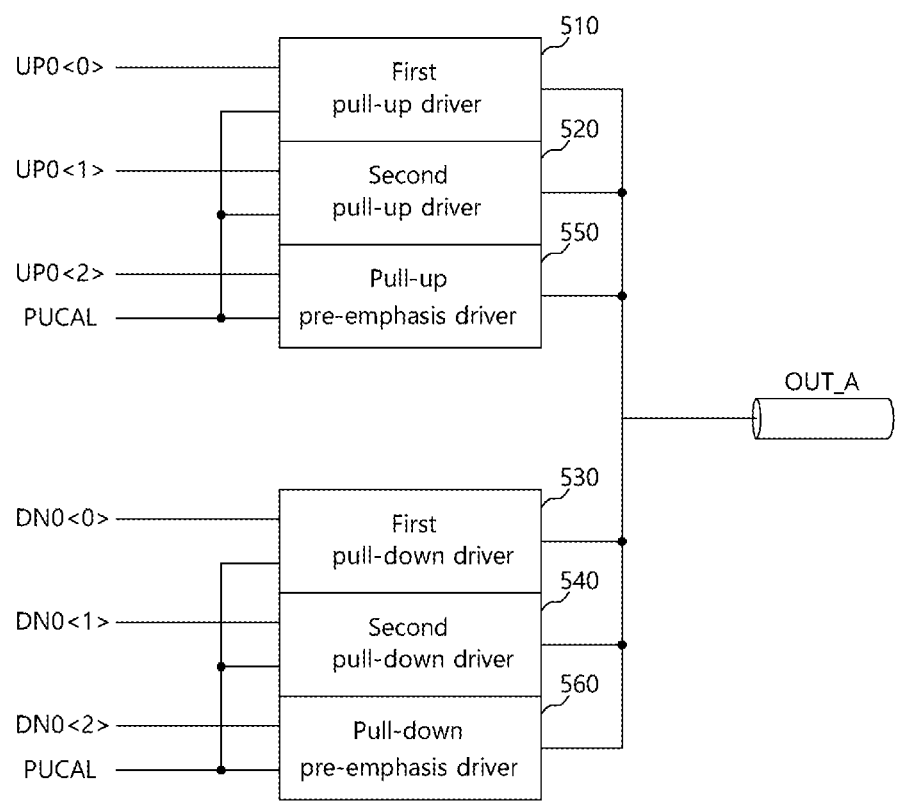
FIG. 5 is a diagram illustrating a representation of an example of the configuration of the first transmission driver illustrated in FIG. 4.

FIG. 5 is a diagram illustrating a representation of an example of the configuration of the first transmission driver 441 illustrated in FIG. 4. Referring to FIG. 5, the first transmission driver 441 may include a plurality of pull-up drivers and a plurality of pull-down drivers. The first transmission driver 441 drives the first wire OUT_A to one level of a high level, a middle level and a low level such that a signal of one of a high level, a middle level and a low level may be transmitted through the first wire OUT_A. The first transmission driver 441 may drive the first wire OUT_A to the high level by turning on a greater number of pull-up drivers than the number of pull-down drivers. The first transmission driver 441 may drive the first wire OUT_A to the low level by turning on a greater number of pull-down drivers than the number of pull-up drivers. The first transmission driver 441 may drive the first wire OUT_A to the middle level by turning on equal numbers of pull-up drivers and pull-down drivers.

Referring to FIG. 5, the first transmission driver 441 may include first and second pull-up drivers 510 and 520 and first and second pull-down drivers 530 and 540. The first pull-up driver 510 may pull-up drive the first wire OUT_A to the level of a power supply voltage when the first up control signal UP0<0> is enabled. The second pull-up driver 520 may pull-up drive the first wire OUT_A to the level of the power supply voltage when the second up control signal UP0<1> is enabled. The first pull-down driver 530 may pull-down drive the first wire OUT_A to the level of a ground voltage when the first down control signal DN0<0> is enabled. The second pull-down driver 540 may pull-down drive the first wire OUT_A to the level of the ground voltage when the second down control signal DN0<1> is enabled.

The first transmission driver 441 may further include a pull-up pre-emphasis driver 550 and a pull-down pre-emphasis driver 560. The pull-up pre-emphasis driver 550 may additionally pull-up drive the first wire OUT_A when the third up control signal UP0<2> is enabled. The pull-down pre-emphasis driver 560 may additionally pull-down drive the first wire OUT_A when the third down control signal DN0<2> is enabled.

If both the first and second pull-up drivers 510 and 520 are turned on, the first transmission driver 441 may transmit a signal of a high level through the first wire OUT_A. If both the first and second pull-down drivers 530 and 540 are turned on, the first transmission driver 441 may transmit a signal of a low level through the first wire OUT_A. If one of the first and second pull-up drivers 510 and 520 and one of the first and second pull-down drivers 530 and 540 are turned on, the first transmission driver 441 may drive the first wire OUT_A to the middle level and a signal of a middle level may be transmitted through the first wire OUT_A. The second and third transmission drivers 442 and 443 have substantially the same configuration as the first transmission driver 441 except signals received thereby and wires coupled therewith.

Figure 6:
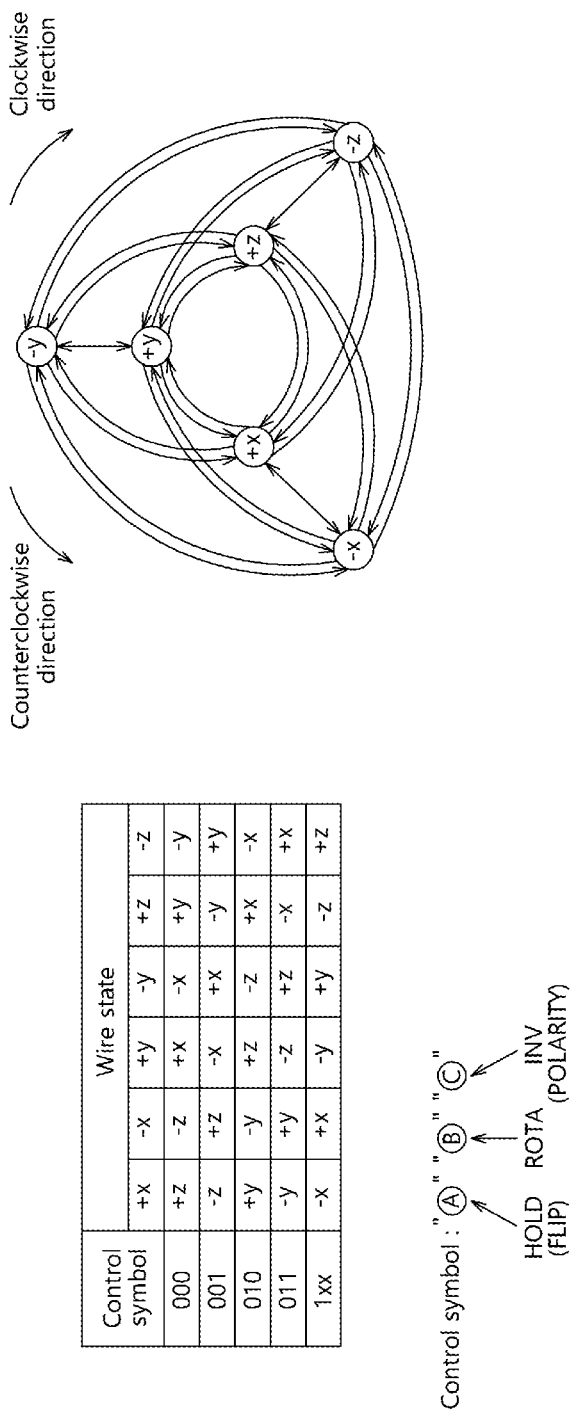
FIG. 6 is representations of examples of a table and a state diagram to assist in the explanation of wire states changed based on control symbols in accordance with an embodiment.

FIG. 6 is representations of examples of a table and a state diagram to assist in the explanation of wire states changed based on the control symbols HOLD, ROTA and INV in accordance with an embodiment. The first to third wires OUT_A, OUT_B and OUT_C may be changed in their states according to the control symbols HOLD, ROTA and INV, and be driven to a high level, a middle level and a low level. In a present embodiment, the control symbols HOLD, ROTA and INV may be configured by 3 bits. A first bit A of the control symbols HOLD, ROTA and INV may correspond to a hold information HOLD, a second bit B of the control symbols HOLD, ROTA and INV may correspond to a rotation information ROTA, and a third bit C of the control symbols HOLD, ROTA and INV may correspond to an inversion information INV. The hold information HOLD may be a flip information. If the hold information HOLD is a first level, a polarity of a transmission control signal and/or a write state may be changed. If the hold information HOLD is a second level, a polarity of a write state may not be changed. The hold information HOLD has a priority over the rotation information ROTA and the inversion information INV. If the hold information HOLD is a logic low level, a wire state may be changed in only its polarity, regardless of the rotation information ROTA and the inversion information INV. The rotation information ROTA may change a wire state in a clockwise direction or a counterclockwise direction. For example, the rotation information ROTA may rotatively change a wire state in a clockwise direction or a counterclockwise direction with regards to a wire state. For example, if the rotation information ROTA is a first level, a wire state may be changed in the clockwise direction, and, if the rotation information ROTA is a second level, a wire state may be changed in the counterclockwise direction. The inversion information INV may change a polarity of a wire state, along with the rotation information ROTA. For example, if the inversion information INV is a first level, a polarity of a wire state may be changed, and, if the inversion information INV is a second level, a polarity of a wire state may not be changed or be maintained. In a present embodiment, the hold information HOLD, the rotation information ROTA and the inversion information INV may be binary number information, respectively. The first level may be a logic high level, and the second level may be a logic low level.

As in the table and the state diagram illustrated, if the hold information HOLD is 1, a polarity of a wire state may be changed regardless of the rotation information ROTA and the inversion information INV (in the case of 1xx). That is to say, when a wire state is +x, the wire state may be changed to −x, and, when a wire state is −x, the wire state may be changed to +x. Also, +y may be changed to −y, −y may be changed to +y, +z may be changed to −z, and −z may be changed to +z.

When the hold information HOLD is 0, a wire state may be changed in a variety of ways according to the rotation information ROTA and the inversion information INV. If the rotation information ROTA is 0 and the inversion information INV is 0 (in the case of 000), a wire state may not be changed in its polarity, and be changed to a wire state which is positioned in the counterclockwise direction. For example, when a wire state is +x, the wire state may be changed to +z. Similarly, −x may be changed to −z, +y may be changed to +x, −y may be changed to −x, +z may be changed to +y, and −z may be changed to −y.

If the hold information HOLD is 0, the rotation information ROTA is 0 and the inversion information INV is 1 (in the case of 001), a wire state may be changed to a wire state which is positioned in the counterclockwise direction, while being changed in its polarity. For example, when a wire state is +x, the wire state may be changed to −z. Similarly, −x may be changed to +z, +y may be changed to −x, −y may be changed to +x, +z may be changed to −y, and −z may be changed to +y.

If the hold information HOLD is 0, the rotation information ROTA is 1 and the inversion information INV is 0 (in the case of 010), a wire state may be changed to a wire state which is positioned in the clockwise direction, while not being changed in its polarity. For example, when a wire state is +x, the wire state may be changed to +y. Similarly, −x may be changed to −y, +y may be changed to +z, −y may be changed to −z, +z may be changed to +x, and −z may be changed to −x.

If the hold information HOLD is 0, the rotation information ROTA is 1 and the inversion information INV is 1 (in the case of 011), a wire state may be changed to a wire state which is positioned in the clockwise direction, while being changed in its polarity. For example, when a wire state is +x, the wire state may be changed to −y. Similarly, −x may be changed to +y, +y may be changed to −z, −y may be changed to +z, +z may be changed to −x, and −z may be changed to +x. The encoder 420 (see FIG. 4), the transmission controller 430 and the transmission driver 440 should drive each of the first to third wires OUT_A, OUT_B and OUT_C to one of a high level, a middle level and a low level, to correspond to a wire state to which change is made according to the control symbols HOLD, ROTA and INV.

Figure 7:
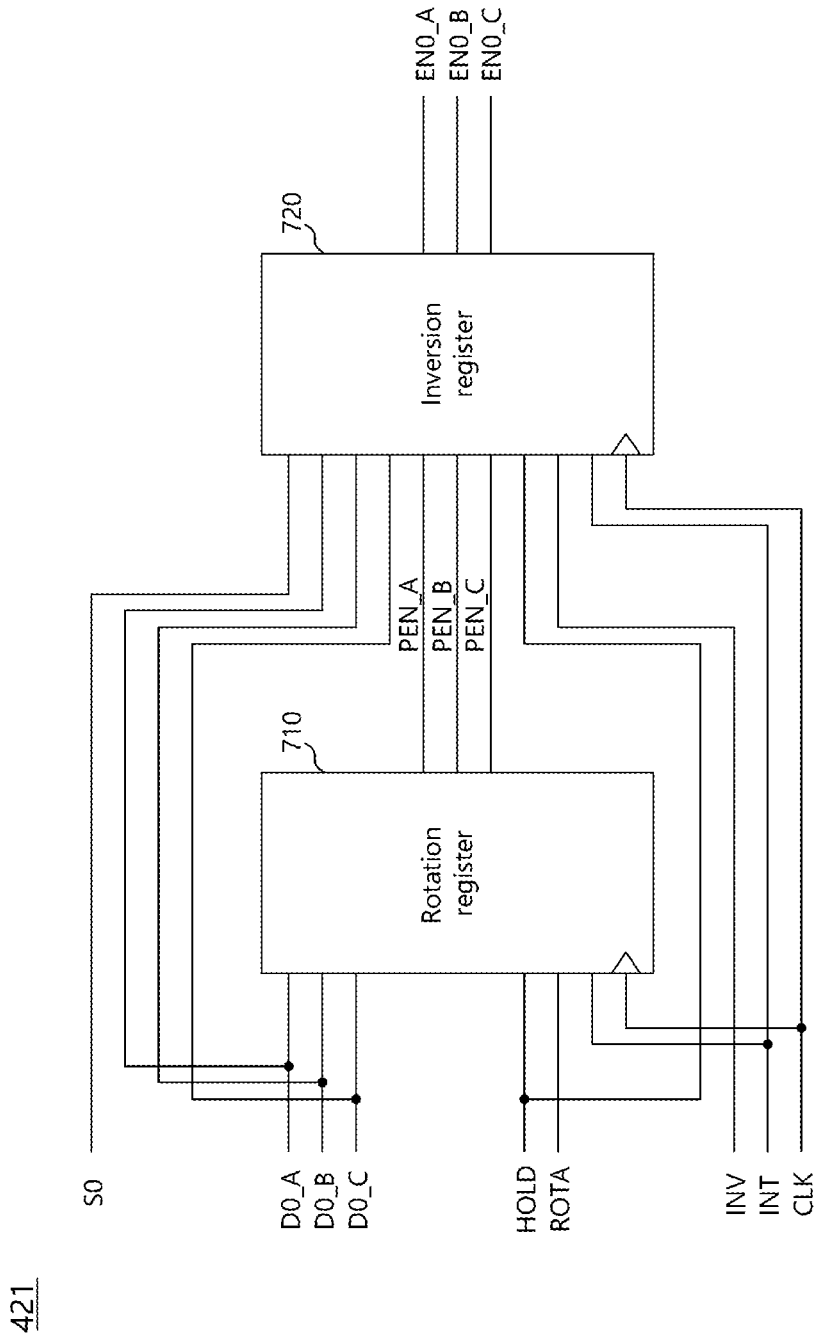
FIG. 7 is a diagram illustrating a representation of an example of the configuration of the first encoder illustrated in FIG. 4.

FIG. 7 is a diagram illustrating a representation of an example of the configuration of the first encoder 421 illustrated in FIG. 4. The first encoder 421 may include a rotation register 710 and an inversion register 720. The rotation register 710 may change wire state information according to control symbols, and generate rotation encoding signals. Since the rotation register 710 receives the MSB information D0_A, D0_B and D0_C of first to third wire states from the logic circuit 410, the rotation register 710 may be a MSB rotation register. The MSB rotation register 710 may change the MSB information D0_A, D0_B and D0_C based on the hold information HOLD and the rotation information ROTA, and generate MSB rotation encoding signals PEN_A, PEN_B and PEN_C. For example, the MSB rotation register 710 may rotatively (i.e., see FIG. 6 and associated paragraphs) change the logic levels of the MSB rotation encoding signals PEN_A, PEN_B and PEN_C based on the hold information HOLD and the rotation information ROTA. The MSB information D0_A, D0_B and D0_C may total 3 bits including 1 bit as the MSB information of a first wire state, 1 bit as the MSB information of a second wire state and 1 bit as the MSB information of a third wire state. For example, when the hold information HOLD is the first level, the MSB rotation register 710 may generate the MSB rotation encoding signals PEN_A, PEN_B and PEN_C without changing or with maintaining the MSB information D0_A, D0_B and D0_C. When the hold information HOLD is at the second level, the MSB rotation register 710 may change logic values of the 3 bits through rotation in the clockwise direction or the counterclockwise direction, and output changed signals as the MSB rotation encoding signals PEN_A, PEN_B and PEN_C. The MSB rotation register 710 may be initialized by receiving the initialization signal INT, and perform the operation of changing the MSB information D0_A, D0_B and D0_C in synchronization with the clock signal CLK.

The inversion register 720 may change the rotation encoding signals PEN_A, PEN_B and PEN_C outputted from the rotation register 710 based on control symbols, and generate the transmission control signals EN0_A, EN0_B and EN0_C. Similarly to the MSB rotation register 710, since the inversion register 720 changes the MSB information D0_A, D0_B and D0_C, the inversion register 720 may be an MSB inversion register. The MSB inversion register 720 may change the MSB rotation encoding signals PEN_A, PEN_B and PEN_C, based on the hold information HOLD and the inversion information INV. For example, when the hold information HOLD is the first level, the MSB inversion register 720 may generate the first transmission control signals EN0_A, EN0_B and EN0_C without changing or with maintaining the MSB rotation encoding signals PEN_A, PEN_B and PEN_C. When the hold information HOLD is the second level, the MSB inversion register 720 may generate the first transmission control signals EN0_A, EN0_B and EN0_C by inverting levels of the MSB rotation encoding signals PEN_A, PEN_B and PEN_C based on the inversion information INV. The MSB inversion register 720 may be set in initial values by receiving the MSB information D0_A, D0_B and D0_C of wire states and the initial setting signal S0, and may be initialized by receiving the initialization signal INT. The MSB inversion register 720 may output the first transmission control signals EN0_A, EN0_B and EN0_C in synchronization with the clock signal CLK.

The second encoder 422 may have the same configuration as the first encoder 421 except that signals inputted thereto and signals outputted therefrom are different. Since the second encoder 422 changes the LSB information D1_A, D1_B and D1_C of wire states according to the control symbols HOLD, ROTA and INV, the second encoder 422 may include an LSB rotation register and an LSB inversion register. The LSB rotation register may have substantially the same configuration as the MSB rotation register 710, and perform the same operation according to the control symbols HOLD, ROTA and INV. Similarly, the LSB inversion register may have substantially the same configuration as the MSB inversion register 720, and perform the same operation according to the control symbols HOLD, ROTA and INV.

Figure 8:
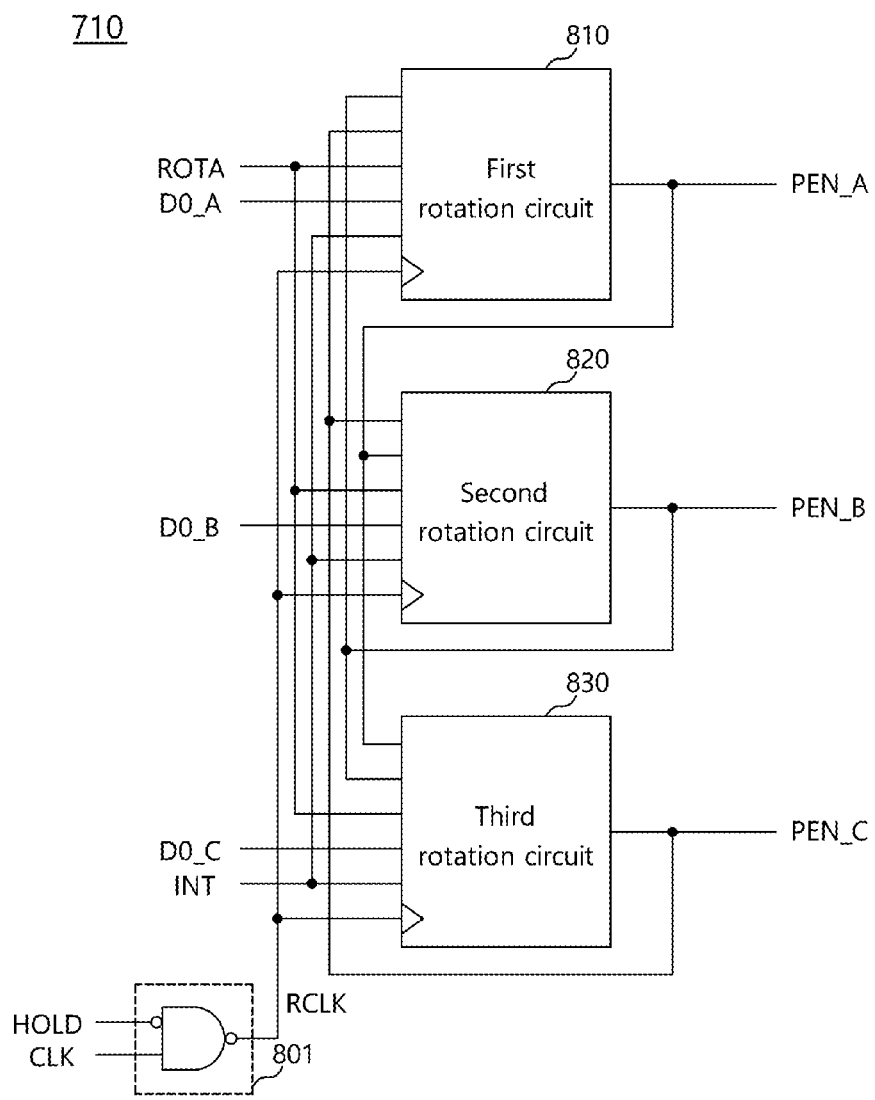
FIG. 8 is a diagram illustrating a representation of an example of the configuration of the rotation register illustrated in FIG. 7.

FIG. 8 is a diagram illustrating a representation of an example of the configuration of the rotation register 710 illustrated in FIG. 7. In FIG. 8, the rotation register 710 may include a rotation controller 801, and first to third rotation circuits 810, 820 and 830. The rotation controller 801 may determine whether to activate the first to third rotation circuits 810, 820 and 830, based on the hold information HOLD. For example, if the hold information HOLD is the first level, the rotation controller 801 may control the first to third rotation circuits 810, 820 and 830 not to change levels of currently outputted first to third rotation encoding signals PEN_A, PEN_B and PEN_C. If the hold information HOLD is the second level, the rotation controller 801 may control the first to third rotation circuits 810, 820 and 830 to rotate and thereby change logic values of the first to third rotation encoding signals PEN_A, PEN_B and PEN_C according to the rotation information ROTA. The rotation controller 801 may combine the hold information HOLD and the clock signal CLK, and generate a rotation clock RCLK. The rotation controller 801 may include a logic gate, for example but not limited to, an AND gate. The rotation clock RCLK may be a signal which is generated by performing an AND operation on an inverted signal of the hold information HOLD and the clock signal CLK.

The first rotation circuit 810 may receive the MSB information D0_A of a first wire state, the second and third rotation encoding signals PEN_B and PEN_C, and the rotation information ROTA. A logic value of the first rotation encoding signal PEN_A may be initially set according to the MSB information D0_A of a first wire state. The first rotation circuit 810 may output the second rotation encoding signal PEN_B as the first rotation encoding signal PEN_A when the rotation information ROTA is the second level, and output the third rotation encoding signal PEN_C as the first rotation encoding signal PEN_A when the rotation information ROTA is the first level. The second rotation circuit 820 may receive the MSB information D0_B of a second wire state, the third and first rotation encoding signals PEN_C and PEN_A, and the rotation information ROTA. A logic value of the second rotation encoding signal PEN_B may be initially set according to the MSB information D0_B of a second wire state. The second rotation circuit 820 may output the third rotation encoding signal PEN_C as the second rotation encoding signal PEN_B when the rotation information ROTA is the second level, and output the first rotation encoding signal PEN_A as the second rotation encoding signal PEN_B when the rotation information ROTA is the first level. The third rotation circuit 830 may receive the MSB information D0_C of a third wire state, the first and second rotation encoding signals PEN_A and PEN_B, and the rotation information ROTA. A logic value of the third rotation encoding signal PEN_C may be initially set according to the MSB information D0_C of a third wire state. The third rotation circuit 830 may output the first rotation encoding signal PEN_A as the third rotation encoding signal PEN_C when the rotation information ROTA is the second level, and output the second rotation encoding signal PEN_B as the third rotation encoding signal PEN_C when the rotation information ROTA is the first level. The first to third rotation circuits may be initialized by receiving the initialization signal INT, and perform the operation of changing the MSB information D0_A, D0_B and D0_C in synchronization with the clock signal CLK.

Figure 9:
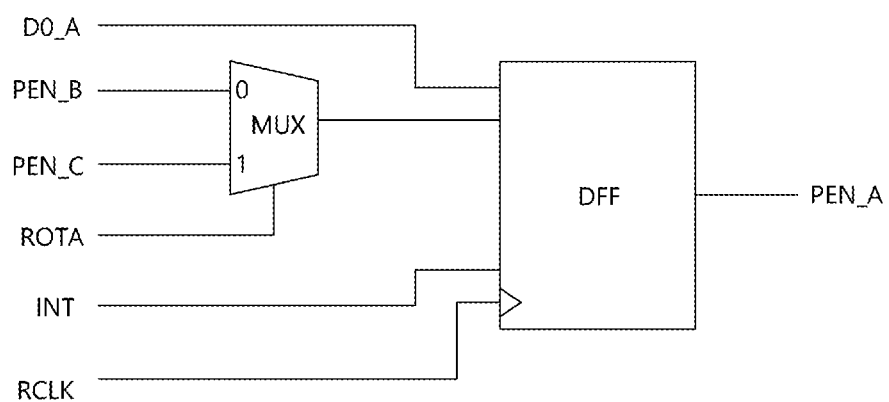
FIG. 9 is a diagram illustrating a representation of an example of the configuration of the first rotation circuit illustrated in FIG. 8.

FIG. 9 is a diagram illustrating a representation of an example of the configuration of the first rotation circuit 810 illustrated in FIG. 8. Referring to FIG. 9, the first rotation circuit 810 may include a multiplexer MUX and a D flip-flop DFF. The multiplexer MUX may output one of the second rotation encoding signal PEN_B and the third rotation encoding signal PEN_C according to the rotation information ROTA. The D flip-flop DFF may set an initial value of the first rotation encoding signal PEN_A according to the MSB information D0_A of a first wire state. The D flip-flop DFF may be activated in response to the rotation clock RCLK. The D flip-flop DFF may retain a logic value of the first rotation encoding signal PEN_A when the rotation clock RCLK is not inputted. The D flip-flop DFF may changed a logic value of the first rotation encoding signal PEN_A based on the output of the multiplexer MUX when the rotation clock RCLK is inputted. Accordingly, the first rotation circuit 810 may output one of the second and third rotation encoding signals PEN_B and PEN_C as the first rotation encoding signal PEN_A according to the rotation information ROTA when the hold information HOLD is 0. The second and third rotation circuits 820 and 830 may have substantially the same configuration as the first rotation circuit 810 except that signals inputted thereto and signals outputted therefrom are different.

Figure 10:
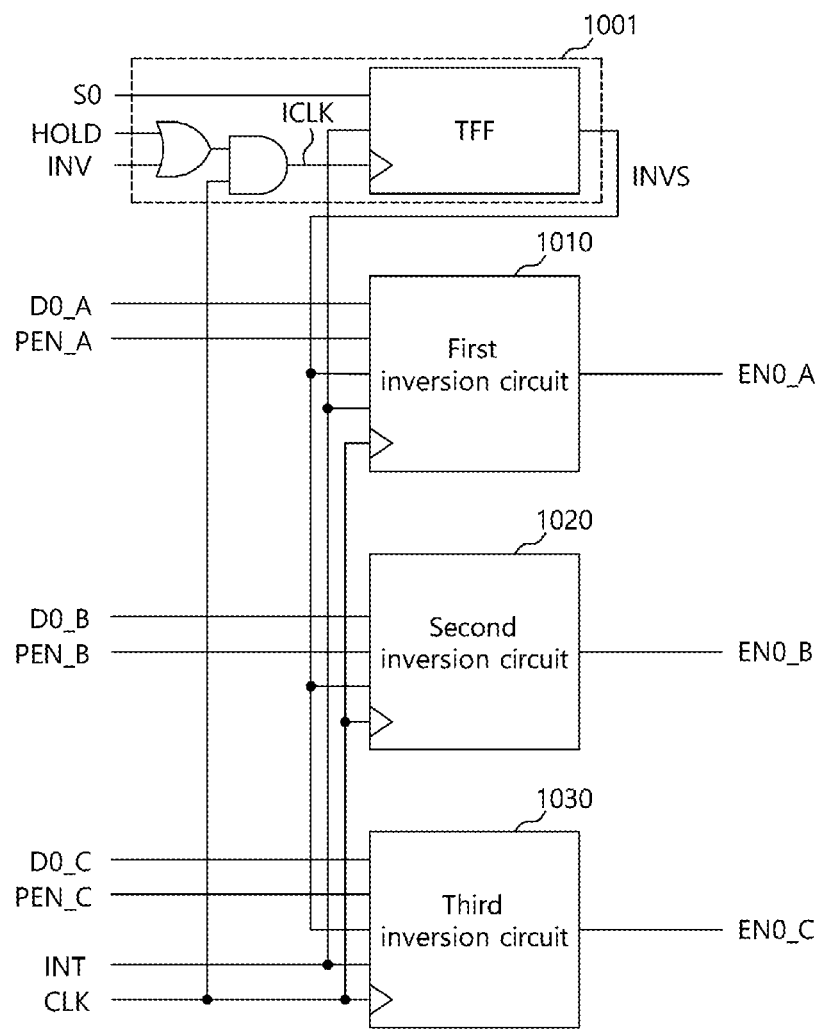
FIG. 10 is a diagram illustrating a representation of an example of the configuration of the inversion register illustrated in FIG. 7.

FIG. 10 is a diagram illustrating a representation of an example of the configuration of the inversion register 720 illustrated in FIG. 7. Referring to FIG. 10, the inversion register 720 may include an inversion controller 1001, a first inversion circuit 1010, a second inversion circuit 1020, and a third inversion circuit 1030. The inversion controller 1001 may receive the hold information HOLD, the inversion information INV, the clock signal CLK and the initial setting signal S0, and generate an inversion control signal INVS. The inversion controller 1001 may include logic gates, for example, an OR gate and an AND gate, and a T flip-flop TFF. The OR gate may receive the hold information HOLD and the inversion information INV. The AND gate may receive the output of the OR gate and the clock signal CLK, and output an inversion clock signal ICLK. The T flip-flop TFF may set an initial level of the inversion control signal INVS according to the initial setting signal S0. The T flip-flop TFF may change a level of the inversion control signal INVS according to the inversion clock signal ICLK. Accordingly, the inversion control signal INVS may be enabled when any one of the hold information HOLD and the inversion information INV is the first level, and the inversion control signal INVS may be disabled when both the hold information HOLD and the inversion information INV are the second level.

The first to third inversion circuits 1010, 1020 and 1030 may respectively receive the first to third rotation encoding signals PEN_A, PEN_B and PEN_C outputted from the rotation register 710, and generate the first to third encoding signals EN0_A, EN0_B and EN0_C. The first inversion circuit 1010 may output the first encoding signal EN0_A by inverting the first rotation encoding signal PEN_A or output the first rotation encoding signal PEN_A as the first encoding signal EN0_A, in response to the inversion control signal INVS. The second inversion circuit 1020 may output the second encoding signal EN0_B by inverting the second rotation encoding signal PEN_B or output the second rotation encoding signal PEN_B as the second encoding signal EN0_B, in response to the inversion control signal INVS. The third inversion circuit 1030 may output the third encoding signal EN0_C by inverting the third rotation encoding signal PEN_C or output the third rotation encoding signal PEN_C as the third encoding signal EN0_C, in response to the inversion control signal INVS. The first to third inversion circuits 1010, 1020 and 1030 may be respectively initialized by the initialization signal INT, and output the first to third encoding signals EN0_A, EN0_B and EN0_C in synchronization with the clock signal CLK. Further, the first to third inversion circuits 1010, 1020 and 1030 may set initial values of the first to third encoding signals EN0_A, EN0_B and EN0_C by receiving the first to third wire state information D0_A, D0_B and D0_C.

Figure 11:
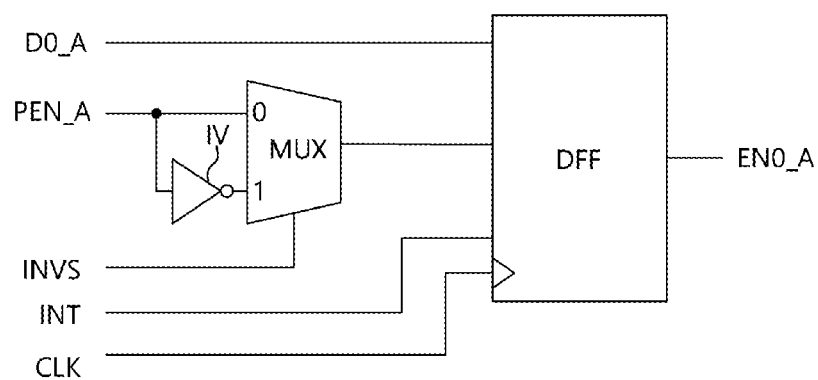
FIG. 11 is a diagram illustrating a representation of an example of the configuration of the first inversion circuit illustrated in FIG. 10.

FIG. 11 is a diagram illustrating a representation of an example of the configuration of the first inversion circuit 1010 illustrated in FIG. 10. The first inversion circuit 1010 may include an inverter IV, a multiplexer MUX, and a D flip-flop DFF. The inverter IV may invert the first rotation encoding signal PEN_A. The multiplexer MUX may output one of the output of the inverter IV and the first rotation encoding signal PEN_A in response to the inversion control signal INVS. The D flip-flop DFF may be initialized by the initial signal INT. The D flip-flop DFF may set an initial value of the first encoding signal EN0_A based on the first wire state information D0_A. The D flip-flop DFF may generate the first encoding signal EN0_A according to the output of the multiplexer MUX in synchronization with the clock signal CLK. Therefore, the first inversion circuit 1010 may output the first encoding signal EN0_A by inverting the first rotation encoding signal PEN_A when the inversion control signal INVS is enabled, and output the first rotation encoding signal PEN_A as it is, as the first encoding signal EN0_A, when the inversion control signal INVS is disabled. The second and third inversion circuits 1020 and 1030 may have substantially the same configuration as the first inversion circuit 1010 except that signals received thereby and signals outputted therefrom are different.

Figure 12:
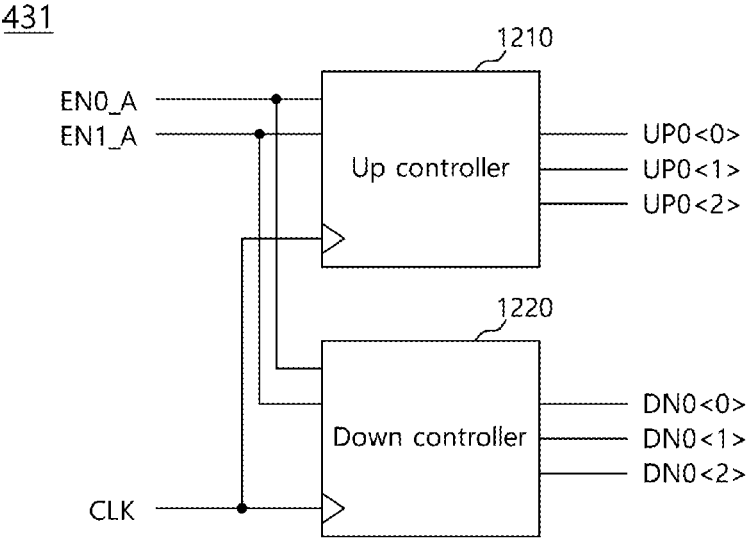
FIG. 12 is a diagram illustrating a representation of an example of the configuration of the first transmission controller illustrated in FIG. 4.

FIG. 12 is a diagram illustrating a representation of an example of the configuration of the first transmission controller 431 illustrated in FIG. 4. The first transmission controller 431 may receive the first encoding signal EN0_A and the fourth encoding signal EN1_A, and generate the plurality of up control signals UP0<0:2> and the plurality of down control signals DN0<0:2>. The first transmission controller 431 may include an up controller 1210 and a down controller 1220. The up controller 1210 may receive the first encoding signal EN0_A and the fourth encoding signal EN1_A, and generate first to third up control signals UP0<0:2> in synchronization with the clock signal CLK. The down controller 1220 may receive the first encoding signal EN0_A and the fourth encoding signal EN1_A, and generate first to third down control signals DN0<0:2> in synchronization with the clock signal CLK.

Among the first to third up control signals UP0<0:2>, the first and second up control signals UP0<0> and UP0<1> may be generated based on levels of the first and fourth encoding signals EN0_A and EN1_A. The first and second up control signals UP0<0> and UP0<1> may be signals for driving the first and second pull-up drivers 510 and 520 of the first transmission driver 441 (see FIG. 5). The third up control signal UP0<2> may be generated based on a result of comparing levels of previously inputted first and fourth encoding signals EN0_A and EN1_A and levels of currently inputted first and fourth encoding signals EN0_A and EN1_A. The third up control signal UP0<2> may be a signal for driving the pull-up pre-emphasis emphasis driver 550 of the first transmission driver 441 (see FIG. 5).

Among the first to third down control signals DN0<0:2>, the first and second down control signals DN0<0> and DN0<1> may be generated based on levels of the first and fourth encoding signals EN0_A and EN1_A. The first and second down control signals DN0<0> and DN0<1> may be signals for driving the first and second pull-down drivers 530 and 540 of the first transmission driver 441 (see FIG. 5). The third down control signal DN0<2> may be generated based on a result of comparing levels of previously inputted first and fourth encoding signals EN0_A and EN1_A and levels of currently inputted first and fourth encoding signals EN0_A and EN1_A. The third down control signal DN0<2> may be a signal for driving the pull-down pre-emphasis driver 560 of the first transmission driver 441 (see FIG. 5).

Figure 13:
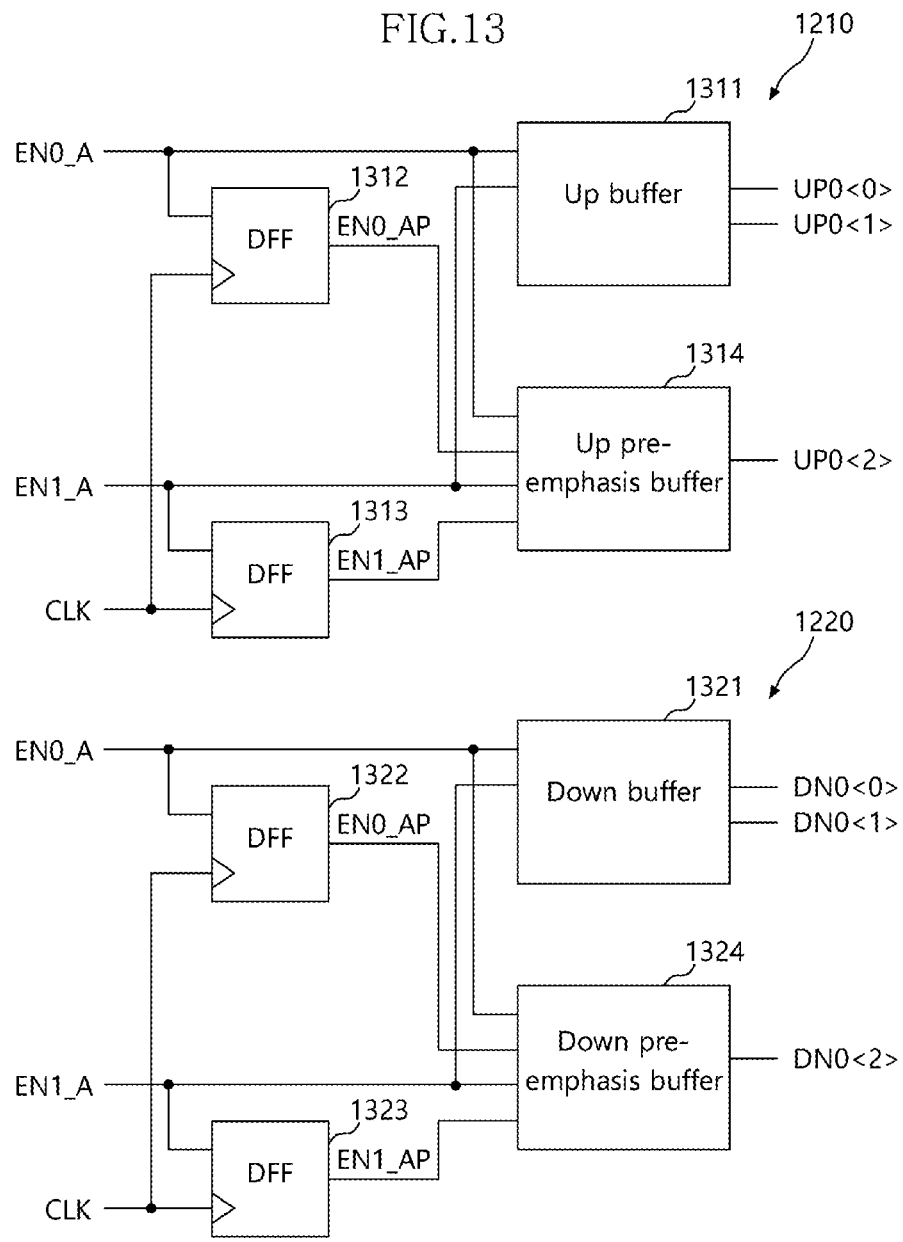
FIG. 13 is a diagram illustrating a representation of an example of the detailed configurations of the up controller and the down controller illustrated in FIG. 12.

FIG. 13 is a diagram illustrating a representation of an example of the configurations of the up controller 1210 and the down controller 1220 illustrated in FIG. 12. Referring to FIG. 13, the up controller 1210 may include an up buffer 1311, a first D flip-flop 1312, a second D flip-flop 1313, and an up pre-emphasis buffer 1314. The up buffer 1311 may generate the first up control signal UP0<0> based on the first encoding signal EN0_A, and generate the second up control signal UP0<1> based on the fourth encoding signal EN1_A. The first D flip-flop 1312 receives the first encoding signal EN0_A, and delays the first encoding signal EN0_A in response to the clock signal CLK and outputs a resultant signal. The output of the first D flip-flop 1312 may be a previously inputted first encoding signal EN0_AP. The second D flip-flop 1313 receives the fourth encoding signal EN1_A, and delays the fourth encoding signal EN1_A in response to the clock signal CLK and outputs a resultant signal. The output of the second D flip-flop 1313 may be a previously inputted fourth encoding signal EN1_AP. The up pre-emphasis buffer 1314 may receive the first and fourth encoding signals EN0_A and EN1_A and the outputs of the first and second D flip-flops 1312 and 1313, and generate the third up control signal UP0<2>. The up pre-emphasis buffer 1314 may generate the third up control signal UP0<2> by comparing levels of the previously inputted first and fourth encoding signals EN0_AP and EN1_AP from the first and second D flip-flops 1312 and 1313 and levels of the currently inputted first and fourth encoding signals EN0_A and EN1_A.

Referring to FIG. 13, the down controller 1220 may include a down buffer 1321, a third D flip-flop 1322, a fourth D flip-flop 1323, and a down pre-emphasis buffer 1324. The down buffer 1321 may generate the first down control signal DN0<0> based on the first encoding signal EN0_A, and generate the second down control signal DN0<1> based on the fourth encoding signal EN1_A. The third D flip-flop 1322 receives the first encoding signal EN0_A, and delays the first encoding signal EN0_A in response to the clock signal CLK and outputs a resultant signal. The output of the third D flip-flop 1322 may be a previously inputted first encoding signal EN0_AP. The fourth D flip-flop 1323 receives the fourth encoding signal EN1_A, and delays the fourth encoding signal EN1_A in response to the clock signal CLK and outputs a resultant signal. The output of the fourth D flip-flop 1323 may be a previously inputted fourth encoding signal EN1_AP. The down pre-emphasis buffer 1324 may receive the first and fourth encoding signals ENO_A and EN1_A and the outputs of the third and fourth D flip-flops 1322 and 1323, and generate the third down control signal DN0<2>. The down pre-emphasis buffer 1324 may generate the third down control signal DN0<2> by comparing levels of the previously inputted first and fourth encoding signals EN0_AP and EN1_AP from the third and fourth D flip-flops 1322 and 1323 and levels of the currently inputted first and fourth encoding signals EN0_A and EN1_A.

Figure 14:
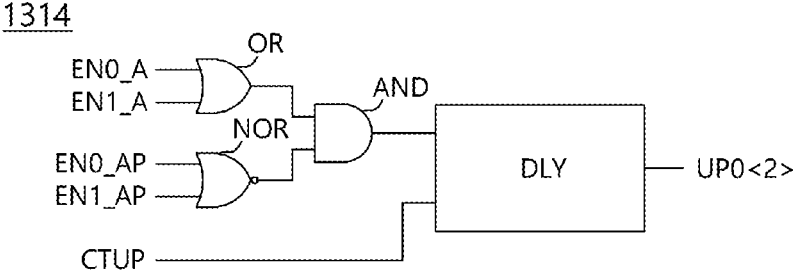
FIG. 14 is a diagram illustrating a representation of an example of the configuration of the up pre-emphasis buffer illustrated in FIG. 13.

FIG. 14 is a diagram illustrating a representation of an example of the configuration of the up pre-emphasis buffer 1314 illustrated in FIG. 13. Referring to FIG. 14, the up pre-emphasis buffer 1314 may include logic gates, for example, an OR gate OR, a NOR gate NOR, an AND gate AND, and a delay DLY. The OR gate OR may receive the currently inputted first and fourth encoding signals EN0_A and EN1_A. The NOR gate NOR may receive the previously inputted first and fourth encoding signals EN0_AP and EN1_AP. The AND gate AND may receive the outputs of the OR gate OR and the NOR gate NOR. The AND gate AND may generate an output signal of the first level when both the outputs of the OR gate OR and the NOR gate NOR are the first level. The OR gate OR may generate an output signal of the first level in the case where even one of the first and fourth encoding signals EN0_A and EN1_A is the first level, and the NOR gate NOR may generate an output signal of the first level only when both the previously inputted first and fourth encoding signals EN0_AP and EN1_AP are the second level. The first and fourth encoding signals ENO_A and EN1_A may be respectively the MSB information and the LSB information of a first wire state. Therefore, if both the previously inputted first and fourth encoding signals EN0_AP and EN1_AP are the second level, the first wire OUT_A may have transmitted a signal of the low level. In the case where any one of the currently inputted first and fourth encoding signals EN0_A and EN1_A is the first level, it may be sensed that the first wire OUT_A transmits a signal of the low level and then transmits a signal of the middle level or the high level. Therefore, the up pre-emphasis buffer 1314 may enable the third up control signal UP0<2> when both the previously inputted first and fourth encoding signals EN0_AP and EN1_AP are the second level and any one of the currently inputted first and fourth encoding signals EN0_A and EN1_A is the first level. The delay DLY may receive the output of the AND gate AND, and generate the third up control signal UP0<2>. The delay DLY may receive an up pre-emphasis control signal CTUP. The up pre-emphasis control signal CTUP may determine whether or not to perform a pre-emphasis operation of the transmitting device 4, and may control the strength of the pre-emphasis operation. The delay DLY may determine whether or not to output the third up control signal UP0<2>, based on the up pre-emphasis control signal CTUP, and change a pulse width and an output timing of the third up control signal UP0<2>.

Figure 15:
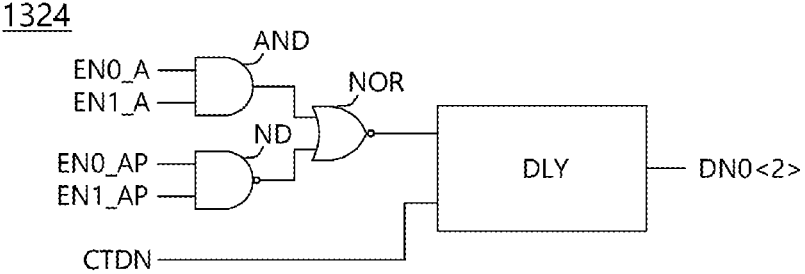
FIG. 15 is a diagram illustrating a representation of an example of the configuration of the down pre-emphasis buffer illustrated in FIG. 13.

FIG. 15 is a diagram illustrating a representation of an example of the configuration of the down pre-emphasis buffer 1324 illustrated in FIG. 13. The down pre-emphasis buffer 1324 may include logic gates, for example, an AND gate AND, a NAND gate ND, a NOR gate NOR, and a delay DLY. The AND gate AND may receive the currently inputted first and fourth encoding signals EN0_A and EN1_A. The NAND gate ND may receive the previously inputted first and fourth encoding signals EN0_AP and EN1_AP. The NOR gate NOR may receive the outputs of the AND gate AND and the NAND gate ND. The NOR gate NOR may generate an output signal of the first level when both the outputs of the AND gate AND and the NAND gate ND are the second level. The AND gate AND may generate an output signal of the second level in the case where any one of the first and fourth encoding signals EN0_A and EN1_A is the second level, and the NAND gate ND may generate an output signal of the second level only when both the previously inputted first and fourth encoding signals EN0_AP and EN1_AP are the first level. The first and fourth encoding signals EN0_A and EN1_A may be respectively the MSB information and the LSB information of a first wire state. Accordingly, in the case where both the previously inputted first and fourth encoding signals EN0_AP and EN1_AP are the first level and then any one of the currently inputted first and fourth encoding signals EN0_A and EN1_A is changed to the second level, it may be sensed that the first wire OUT_A transmits a signal of the high level and then transmits a signal of the middle level or the low level. Therefore, the down pre-emphasis buffer 1324 may enable the third down control signal DN0<2> when both the previously inputted first and fourth encoding signals EN0_AP and EN1_AP are the first level and any one of the currently inputted first and fourth encoding signals EN0_A and EN1_A is the second level. The delay DLY may receive the output of the NOR gate NOR, and generate the third down control signal DN0<2>. The delay DLY may receive a down pre-emphasis control signal CTDN. The down pre-emphasis control signal CTDN may determine whether or not to perform a pre-emphasis operation of the transmitting device 4, and may control the strength of the pre-emphasis operation. The delay DLY may determine whether or not to output the third down control signal DN0<2>, based on the down pre-emphasis control signal CTDN, and change a pulse width and an output timing of the third down control signal DN0<2>.

Figure 16:
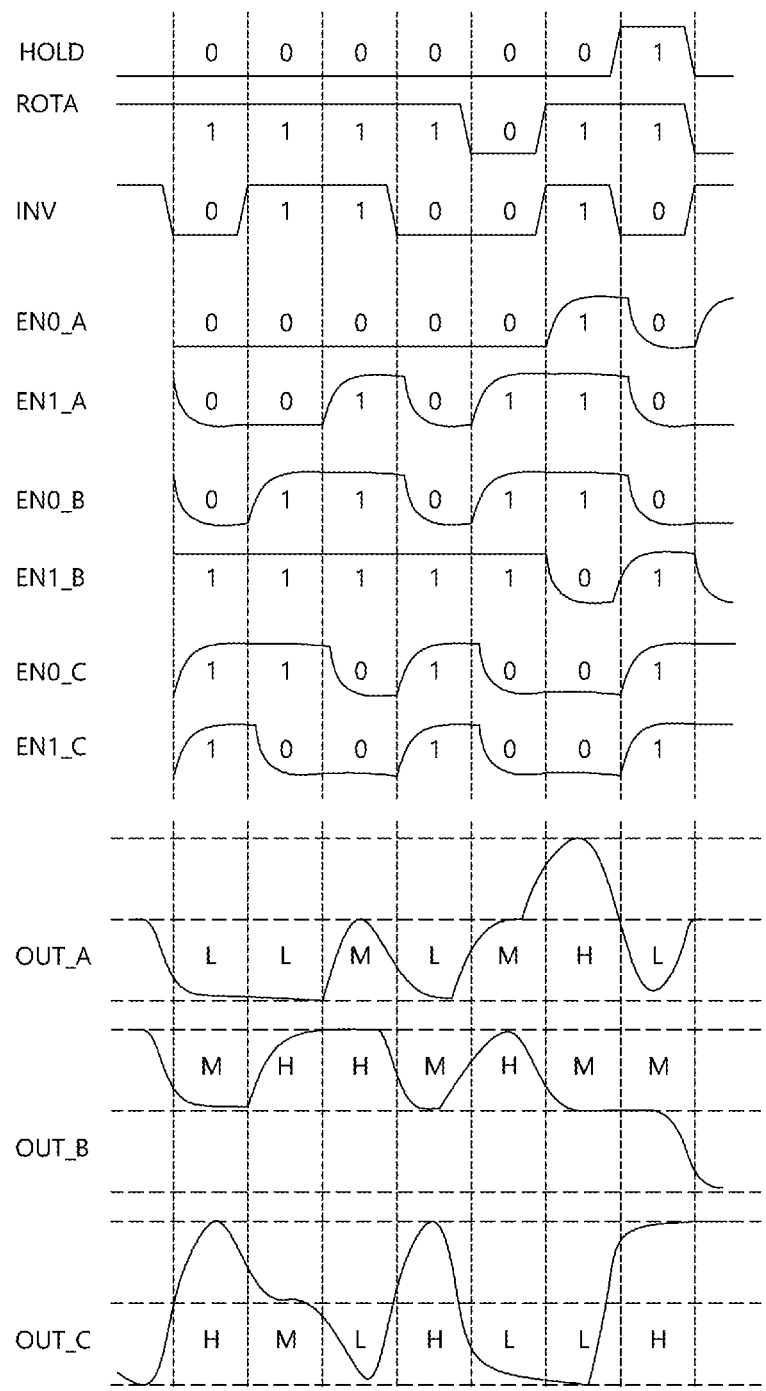
FIG. 16 is a representation of an example of a diagram to assist in the explanation of the operation of the transmitting device in accordance with an embodiment.

FIG. 16 is a representation of an example of a diagram to assist in the explanation of the operation of the transmitting device 4 in accordance with an embodiment. The operation of the transmitting device 4 in accordance with an embodiment will be described below with reference to FIGS. 4 to 16. When assuming that an initial wire state is +z, the first wire OUT_A may transmit a low level L, the second wire OUT_B may transmit a middle level M, and the third wire OUT_C may transmit a high level H. Accordingly, the MSB information D0_A, D0_B and D0_C of the wire state may be 0, 0, 1, and the first to third encoding signals EN0_A, EN0_B and EN0_C may be set to 0, 0, 1, respectively. The LSB information D1_A, D1_B and D1_C of the wire state may be 0, 1, 1, and the fourth to sixth encoding signals EN1_A, EN1_B and EN1_C may be set to 0, 1, 1, respectively. In order to change the wire state +z to the wire state −x, the logic circuit 410 may generate the control symbols HOLD, ROTA and INV. The control symbols HOLD, ROTA and INV may be 0, 1, 1. In other words, the hold information HOLD may be the second level, and the rotation information ROTA and the inversion information INV may be the first level. According to this fact, the MSB rotation register 710 may rotate the first to third rotation encoding signals PEN_A, PEN_B and PEN_C set to 0, 0, 1 according to the MSB information D0_A, D0_B and D0_C, in the clockwise direction, and generate the first to third rotation encoding signals PEN_A, PEN_B and PEN_C being 1, 0, 0. The MSB inversion register 720 may invert the first to third rotation encoding signals PEN_A, PEN_B and PEN_C, and generate the first to third encoding signals EN0_A, EN0_B and EN0_C being 0, 1, 1. Similarly, the LSB rotation register of the second encoder 422 may rotate rotation encoding signals set to 0, 1, 1 according to the LSB information D1_A, D1_B and D1_C, in the clockwise direction, and generate rotation encoding signals being 1, 0, 1. The LSB inversion register of the second encoder 422 may invert the rotation encoding signals, and generate the fourth to sixth encoding signals EN1_A, EN1_B and EN1_C being 0, 1, 0.

The up controller 1210 of the first transmission controller 431 may disable both the up control signals UP0<0> and UP0<1> according to the first and fourth encoding signals EN0_A and EN1_A. The down controller 1220 of the first transmission controller 431 may enable both the down control signals DN0<0> and DN0<1> according to the first and fourth encoding signals EN0_A and EN1_A. Accordingly, both the first and second pull-down drivers 530 and 540 of the first transmission driver 441 may be turned on, and the first wire OUT_A may transmit a signal of the low level L. The second transmission controller 432 may enable both the up control signals UP1<0> and UP1<1> according to the second and fifth encoding signals EN0_B and EN1_B. Accordingly, both the pull-up drivers of the second transmission driver 442 may be turned on, and the second wire OUT_B may transmit a signal of the high level H. The third transmission controller 433 may enable the up control signal UP2<0> and the down control signal DN2<1> according to the third and sixth encoding signals EN0_C and EN1_C. Accordingly, the first pull-up driver and the second pull-down driver of the third transmission driver 443 may be turned on together, and the third wire OUT_C may transmit a signal of the middle level M. Because the first wire OUT_A is driven to the low level L, the second wire OUT_B is driven to the high level H and the third wire OUT_C is driven to the middle level M, a wire state may become −x.

When a wire state is +z, the first to third encoding signals EN0_A, EN0_B and EN0_C may be 0, 0, 1, and the fourth to sixth encoding signals EN1_A, EN1_B and EN1_C may be 0, 1, 1. In order to change the wire state +z to the wire state +y, the logic circuit 410 may generate the control symbols HOLD, ROTA and INV being 0, 0, 0. The MSB rotation register 710 may rotate the first to third rotation encoding signals PEN_A, PEN_B and PEN_C being 0, 0, 1, in the counterclockwise direction, and generate the first to third rotation encoding signals PEN_A, PEN_B and PEN_C being 0, 1, 0. The MSB inversion register 720 may non-invert the first to third rotation encoding signals PEN_A, PEN_B and PEN_C, and generate the first to third encoding signals EN0_A, EN0_B and EN0_C being 0, 1, 0. The LSB rotation register of the second encoder 422 may rotate rotation encoding signals being 0, 1, 1 in the counterclockwise direction, and generate rotation encoding signals being 1, 1, 0. The LSB inversion register of the second encoder 422 may non-invert the rotation encoding signals, and generate the fourth to sixth encoding signals EN1_A, EN1_B and EN1_C being 1, 1, 0. The first transmission controller 431 may enable the up control signal UP0<1> and the down control signal DN0<0> based on the first and fourth encoding signals EN0_A and EN1_A. Accordingly, the second pull-up driver 520 and the first pull-down driver 530 of the first transmission driver 441 may be turned on together, and the first wire OUT_A may transmit a signal of the middle level M. The second transmission controller 432 may enable both the up control signals UP1<0> and UP1<1> and disable both the down control signals DN1<0> and DN1<1>, based on the second and fifth encoding signals EN0_B and EN1_B. Accordingly, both the pull-up drivers of the second transmission driver 442 may be turned on, and the second wire OUT_B may transmit a signal of the high level H. The third transmission controller 433 may disable both the up control signals UP2<0> and UP2<1> and enable both the down control signals DN2<0> and DN2<1>, based on the third and sixth encoding signals EN0_C and EN1_C. Accordingly, both the pull-down drivers of the third transmission driver 443 may be turned on, and the third wire OUT_C may transmit a signal of the low level L. Because the first wire OUT_A is driven to the middle level M, the second wire OUT_B is driven to the high level H and the third wire OUT_C is driven to the low level L, a wire state may be +y.

Figure 17:
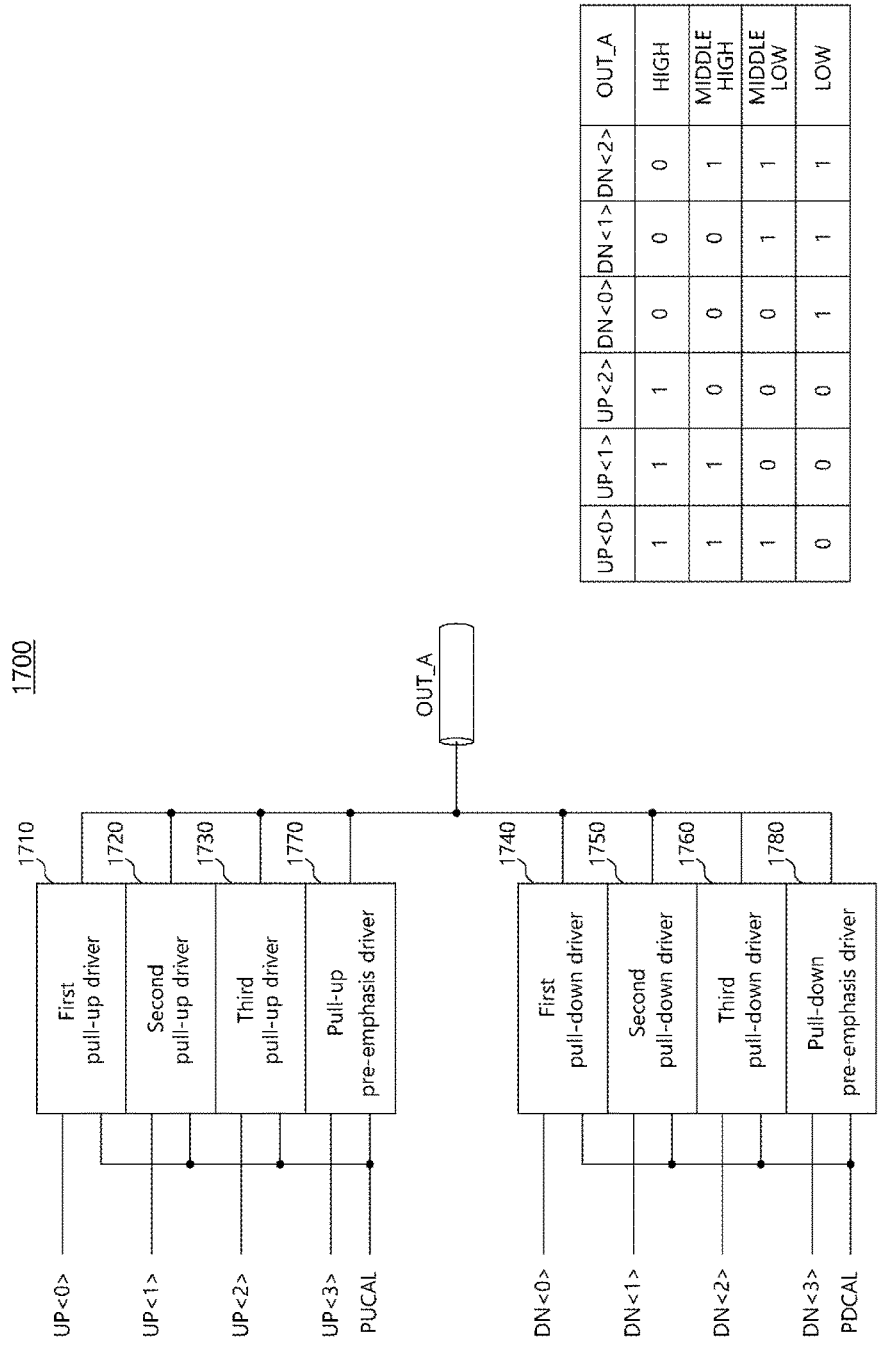
FIG. 17 is a diagram illustrating a representation of an example of the configuration and the operation of a transmitting device in accordance with an embodiment.

FIG. 17 is a diagram illustrating a representation of an example of the configuration and the operation of a transmitting device in accordance with an embodiment. FIGS. 1 to 16 illustrate the configuration of a transmitting device in the case where 3 wires transmit a 3-level symbol. The concept of the present disclosure may be modified and changed, and be applied to a transmitting device which transmits a multilevel symbol having at least 3 levels. Referring FIG. 17, a transmission driver 1700 of a transmitting device capable of transmitting a 4-level symbol through 4 wires is illustrated. The transmission driver 1700 may be coupled with one wire OUT_A among 4 wires capable of transmitting a 4-level symbol. The transmission driver 1700 may drive the wire OUT_A to one of 4 levels. The 4 levels may include, for example, a high level, a middle high level, a middle low level and a low level. The high level may be a voltage level corresponding to $4/5$ V, the middle high level may be a voltage level corresponding to $3/5$ V, the middle low level may be a voltage level corresponding to $2/5$ V, and the low level may be a voltage level corresponding to $1/5$ V.

The transmission driver 1700 may include first to third pull-up drivers 1710, 1720 and 1730, and first to third pull-down drivers 1740, 1750 and 1760. The first to third pull-up drivers 1710, 1720 and 1730 may be turned on in response to first to third up control signals UP<0:2>, respectively, and the first to third pull-down drivers 1740, 1750 and 1760 may be turned on in response to first to third down control signals DN<0:2>, respectively. In order to drive the wire OUT_A to the high level, the first to third up control signals UP<0:2> may be enabled, and the first to third down control signals DN<0:2> may be disabled. Accordingly, as the first to third pull-up drivers 1710, 1720 and 1730 are turned on, a signal of the high level may be transmitted through the wire OUT_A. In order to drive the wire OUT_A to the middle high level, 2 up control signals among the first to third up control signals UP<0:2> may be enabled, and 1 down control signal among the first to third down control signals DN<0:2> may be enabled. For example, the first and second up control signals UP<0> and UP<1> and the third down control signal DN<2> may be enabled, and the third up control signal UP<2> and the first and second down control signals DN<0> and DN<1> may be disabled. Accordingly, as the first and second pull-up drivers 1710 and 1720 are turned on and the third pull-down driver 1760 is turned on, a signal of the middle high level may be transmitted through the wire OUT_A. In order to drive the wire OUT_A to the middle low level, 1 up control signal among the first to third up control signals UP<0:2> may be enabled, and 2 down control signals among the first to third down control signals DN<0:2> may be enabled. For example, the first up control signal UP<0> and the second and third down control signals DN<1> and DN<2> may be enabled, and the second and third up control signals UP<1> and UP<2> and the first down control signal DN<0> may be disabled. Accordingly, as the first pull-up driver 1710 is turned on and the second and third pull-down drivers 1750 and 1760 are turned on, a signal of the middle low level may be transmitted through the wire OUT_A. In order to drive the wire OUT_A to the low level, the first to third up control signals UP<0:2> may be disabled, and the first to third down control signals DN<0:2> may be enabled. Accordingly, as the first to third pull-down drivers 1740, 1750 and 1760 are turned on, a signal of the low level may be transmitted through the wire OUT_A.

The transmission driver 1700 may further include a pull-up pre-emphasis driver 1770 and a pull-down pre-emphasis driver 1780. The pull-up pre-emphasis driver 1770 may be provided to additionally pull-up drive the wire OUT_A when the wire OUT_A is driven from a relatively low level to a high level. The pull-down pre-emphasis driver 1780 may be provided to additionally pull-down drive the wire OUT_A when the wire OUT_A is driven from a relatively high level to a low level. The pull-up pre-emphasis driver 1770 may operate by receiving a fourth up control signal UP<3>, and the pull-down pre-emphasis driver 1780 may operate by receiving a fourth down control signal DN<3>.

Each of the first to third pull-up drivers 1710, 1720 and 1730 and the pull-up pre-emphasis driver 1770 may be controlled in its impedance by receiving a pull-up calibration signal PUCAL. Each of the first to third pull-down drivers 1740, 1750 and 1760 and the pull-down pre-emphasis driver 1780 may be controlled in its impedance by receiving a pull-down calibration signal PDCAL.

While various embodiments have been described above, it will be understood to those skilled in the art that the embodiments described are examples only. Accordingly, the transmitting device for high speed communication, and the interface circuit and the system including the same described herein should not be limited based on the described embodiments.

What is claimed is:

1. A transmitting device comprising:
  a logic circuit configured to generate a hold information, a rotation information, and an inversion information;
  an encoder configured to change information of a wire state based at least in part on the hold information, the rotation information, and the inversion information, and generate transmission control signals;
  a transmission controller configured to generate driving control signals based on the transmission control signals; and
  a transmission driver configured to drive each of a plurality of wires to one level among multiple levels, in response to the driving control signals.

2. The transmitting device according to claim 1, wherein the encoder comprises:
  a first encoder configured to change most significant bit (MSB) information of the wire state according to control symbols, and generate first transmission control signals; and
  a second encoder configured to change least significant bit (LSB) information of the wire state according to control symbols, and generate second transmission control signals.

3. The transmitting device according to claim 2, wherein the first encoder comprises:
  a MSB rotation register configured to generate MSB rotation encoding signals based on the hold information and the rotation information; and
  an MSB inversion register configured to change the MSB rotation encoding signals based on the hold information and the inversion information, and generate the first transmission control signals.

4. The transmitting device according to claim 3, wherein the MSB rotation register changes logic levels of the MSB rotation encoding signals based on the hold information and the rotation information.

5. The transmitting device according to claim 3, wherein the MSB rotation register changes logic levels of the MSB rotation encoding signals based on the hold information and the rotation information to change the wire states in a clockwise direction or a counterclockwise direction with regards to a wire state.

6. The transmitting device according to claim 4,
  wherein the MSB rotation register maintains the MSB rotation encoding signals when the hold information is a first level, and
  wherein the MSB rotation register rotates and changes the logic levels of the MSB rotation encoding signals in a clockwise direction or a counterclockwise direction, based on the rotation information, when the hold information is a second level.

7. The transmitting device according to claim 3,
  wherein the MSB inversion register outputs the first transmission control signals by maintaining the MSB rotation encoding signals, when the hold information is the first level, and
  wherein the MSB inversion register outputs the first transmission control signals by inverting the logic levels of the MSB rotation encoding signals, based on the inversion information, when the hold information is the second level.

8. The transmitting device according to claim 2, wherein the second encoder comprises:
  an LSB rotation register configured to generate LSB rotation encoding signals based on the hold information and the rotation information; and
  an LSB inversion register configured to change the LSB rotation encoding signals based on the hold information and the inversion information, and generate the second transmission control signals.

9. The transmitting device according to claim 2, wherein the transmission controller comprises:
  a first transmission controller configured to generate first driving control signals for driving a first wire, based on first and second transmission control signals;
  a second transmission controller configured to generate second driving control signals for driving a second wire, based on first and second transmission control signals; and
  a third transmission controller configured to generate third driving control signals for driving a third wire, based on first and second transmission control signals.

10. The transmitting device according to claim 9, wherein the first transmission controller comprises:
  an up controller configured to generate a plurality of up control signals based on the first and second transmission control signals; and
  a down controller configured to generate a plurality of down control signals based on the first and second transmission control signals.

11. The transmitting device according to claim 10, wherein the up controller enables a larger number of up control signals than a number of down control signals when both the first and second transmission control signals received thereby are the first level.

12. The transmitting device according to claim 11, wherein the up controller enables the same number of up control signals as a number of down control signals when the first and second transmission control signals received thereby are different levels.

13. The transmitting device according to claim 11, wherein the down controller enables a larger number of down control signals than a number of up control signals when both the first and second transmission control signals received thereby are the second level.

14. The transmitting device according to claim 10,
wherein the up controller compares levels of previously inputted first and second transmission control signals and levels of currently inputted first and second transmission control signals, and generates the up control signal for a pre-emphasis operation, and
wherein the down controller compares levels of previously inputted first and second transmission control signals and levels of currently inputted first and second transmission control signals, and generates the down control signal for a pre-emphasis operation.

15. The transmitting device according to claim 9,
wherein the multiple levels include a high level, a middle level and a low level, and
wherein the transmission driver comprises:
a first transmission driver configured to drive the first wire to one of the high level, the middle level and the low level, based on the first driving control signals;
a second transmission driver configured to drive the second wire to one of the high level, the middle level and the low level, based on the second driving control signals; and
a third transmission driver configured to drive the third wire to one of the high level, the middle level and the low level, based on the third driving control signals.

16. The transmitting device according to claim 15, wherein the first to third transmission drivers includes pluralities of pull-up drivers and pluralities of pull-down drivers, respectively, and changes the numbers of pull-up drivers and pull-down drivers for driving the first to third wires, in response to the first to third driving control signals.

17. The transmitting device according to claim 16,
wherein each of the first to third transmission drivers, respectively, turn on a greater number of the pull-up drivers than a number of pull-down drivers to drive the first to third wires, respectively, to the high level,
wherein each of the first to third transmission drivers, respectively, turn on a greater number of the pull-down drivers than a number of pull-up drivers to drive the first to third wires, respectively, to the low level, and
wherein each of the first to third transmission drivers, respectively, turn on an equal number of pull-down drivers as a number of pull-up drivers to drive the first to third wires, respectively, to the middle level.

18. The transmitting device according to claim 15, wherein the high level has a level corresponding to ¾ V, the middle level has a level corresponding to ½ V, and the low level has a level corresponding to ¼ V.

19. The transmitting device according to claim 18,
wherein the first transmission driver comprises:
a pull-up pre-emphasis driver configured to additionally pull-up drive the first wire; and
a pull-down pre-emphasis driver configured to additionally pull-down drive the first wire.

20. A transmitting device configured for changing states of first to third wires to one of a high level, a middle level and a low level, based on a control symbol, the transmitting device comprising:
a first transmission driver including a plurality of pull-up drivers and a plurality of pull-down drivers, and configured to drive the first wire to one of the high level, the middle level and the low level;
a second transmission driver including a plurality of pull-up drivers and a plurality of pull-down drivers, and configured to drive the second wire to one of the high level, the middle level and the low level; and
a third transmission driver including a plurality of pull-up drivers and a plurality of pull-down drivers, and configured to drive the third wire to one of the high level, the middle level and the low level,
wherein each of the first to third transmission drivers, respectively, turn on a greater number of the pull-up drivers than a number of pull-down drivers to drive the first to third wires, respectively, to the high level,
wherein each of the first to third transmission drivers, respectively, turn on a greater number of the pull-down drivers than a number of pull-up drivers to drive the first to third wires, respectively, to the low level, and
wherein each of the first to third transmission drivers, respectively, turn on an equal number of pull-down drivers as a number of pull-up drivers to drive the first to third wires, respectively, to the middle level.

21. The transmitting device according to claim 20, wherein the high level has a level corresponding to ¾ V, the middle level has a level corresponding to ½ V, and the low level has a level corresponding to ¼ V.

22. The transmitting device according to claim 20,
wherein the first transmission driver further includes:
a pull-up pre-emphasis driver configured to additionally pull-up drive the first wire when driving the first wire from one level to a higher level; and
a pull-down pre-emphasis driver configured to additionally pull-down drive the first wire when driving the first wire from one level to a lower level.

* * * * *